(12) United States Patent
Okel et al.

(10) Patent No.: US 7,704,552 B2
(45) Date of Patent: Apr. 27, 2010

(54) PROCESS FOR PRODUCING CHEMICALLY TREATED AMORPHOUS PRECIPITATED SILICA

(75) Inventors: Timothy A. Okel, Trafford, PA (US); James R. Hahn, Midland, MI (US); Raymond R. Ondeck, McMurray, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 884 days.

(21) Appl. No.: 11/014,332

(22) Filed: Dec. 16, 2004

(65) Prior Publication Data

US 2005/0176852 A1    Aug. 11, 2005

Related U.S. Application Data

(63) Continuation-in-part of application No. 09/636,308, filed on Aug. 11, 2000, now abandoned.

(60) Provisional application No. 60/203,428, filed on May 10, 2000, provisional application No. 60/172,309, filed on Dec. 17, 1999, provisional application No. 60/149,757, filed on Aug. 19, 1999.

(51) Int. Cl.
*B05D 7/00* (2006.01)

(52) U.S. Cl. .................... 427/212; 427/215; 427/220

(58) Field of Classification Search .............. 427/212, 427/220, 215
See application file for complete search history.

(56) References Cited

U.S. PATENT DOCUMENTS

| | | | | |
|---|---|---|---|---|
| 3,122,520 | A | * | 2/1964 | Lentz ......................... 106/490 |
| 3,317,145 | A | * | 5/1967 | Stephanoff ..................... 241/5 |
| 3,690,823 | A | * | 9/1972 | Young ........................ 423/700 |
| 3,692,812 | A | | 9/1972 | Berger ................. 260/448.2 E |
| 3,768,537 | A | | 10/1973 | Hess et al. ................... 152/330 |
| 3,873,489 | A | | 3/1975 | Thurn et al. ......... 260/33.6 AQ |
| 3,922,436 | A | | 11/1975 | Bell et al. .................... 428/375 |
| 4,076,550 | A | | 2/1978 | Thurn et al. ............ 106/288 Q |
| 4,258,102 | A | | 3/1981 | Traver et al. |
| 4,359,342 | A | | 11/1982 | Stacy et al. .................. 523/216 |
| 4,436,847 | A | | 3/1984 | Wagner ...................... 523/203 |
| 4,474,908 | A | | 10/1984 | Wagner ...................... 523/213 |
| 4,704,414 | A | | 11/1987 | Kerner et al. ............... 523/213 |
| 5,009,874 | A | | 4/1991 | Parmentier et al. .......... 423/335 |

(Continued)

FOREIGN PATENT DOCUMENTS

EP    795 579 A1    9/1997

(Continued)

OTHER PUBLICATIONS

Kirk-Othmer, Encyclopedia of Chemical Technology, (4$^{th}$ ed.), vol. 19, J. Wiley and Sons, 1996, pp. 881-904.

(Continued)

*Primary Examiner*—Elena T Lightfoot
(74) *Attorney, Agent, or Firm*—Frank P. Mallak; Deborah M. Aktman

(57) ABSTRACT

Described is an improved process for producing chemically treated fillers by using a certain combination of functionalizing and hydrophobizing agents in an aqueous suspension of inorganic oxide having a pH of 2.5 or less and increasing the pH of the suspension after chemically treating the filler.

11 Claims, 2 Drawing Sheets

CURE PROFILE

U.S. PATENT DOCUMENTS

| | | | |
|---|---|---|---|
| 5,116,886 A | 5/1992 | Wolff et al. | 523/209 |
| 5,580,919 A | 12/1996 | Agostini et al. | 524/430 |
| 5,601,749 A * | 2/1997 | Hall et al. | 510/336 |
| 5,708,069 A | 1/1998 | Burns et al. | |
| 5,763,388 A | 6/1998 | Lightsey et al. | 523/212 |
| 5,789,514 A * | 8/1998 | Burns et al. | 528/12 |
| 5,840,532 A | 11/1998 | McKnight et al. | |
| 5,846,311 A | 12/1998 | Bomal et al. | 106/492 |
| 5,876,494 A | 3/1999 | Bomal et al. | 106/492 |
| 5,908,660 A | 6/1999 | Griffith et al. | 427/220 |
| 5,919,298 A | 7/1999 | Griffith et al. | 106/490 |
| 5,939,484 A | 8/1999 | Araki et al. | |
| 5,973,083 A * | 10/1999 | Matsushita et al. | 526/129 |
| 5,985,953 A | 11/1999 | Lightsey et al. | 523/212 |
| 6,022,923 A | 2/2000 | Araki et al. | 524/494 |
| 6,033,597 A | 3/2000 | Yatsuyanagi et al. | 252/182.17 |
| 6,051,672 A | 4/2000 | Burns et al. | 528/10 |
| 6,159,540 A | 12/2000 | Menon et al. | |
| 6,384,125 B1 | 5/2002 | Bergstrom et al. | |
| 6,649,684 B1 | 11/2003 | Okel | |
| 6,736,891 B1 | 5/2004 | Rice et al. | |

FOREIGN PATENT DOCUMENTS

| | | |
|---|---|---|
| EP | 0 875 532 | 4/1998 |
| EP | 849 320 A1 | 6/1998 |
| EP | 890 600 A1 | 1/1999 |
| EP | 0 928 818 | 7/1999 |
| EP | 931 812 A1 | 7/1999 |
| JP | 10-316406 A | 2/1998 |
| WO | WO 98/47955 | 10/1998 |
| WO | WO 99/09036 | 2/1999 |
| WO | WO 01/12733 A | 2/2001 |
| WO | WO 2004/031302 A2 | 4/2004 |

OTHER PUBLICATIONS

J.W. Lightsey et al., DSM Copolymer, Inc., "Silica Wet Masterbatch: A New Process for Pre-Dispersion of Silica in Emulsion Polymers", ACS Meeting, Oct. 1997.

A. Krysztafkiewicz, "Modified Silica Precipitated in the Medium of Organic Solvents-an Active Rubber Filler", Colloid & Polymer Science, vol. 267, pp. 399-408.

A. Krysztafkiewicz, "Modified Silica Precipitated in the Medium of Organic Solvents-an Active Rubber Filler", Colloid & Polymer Science, vol. 267, pp. 399-408, 1989.

* cited by examiner

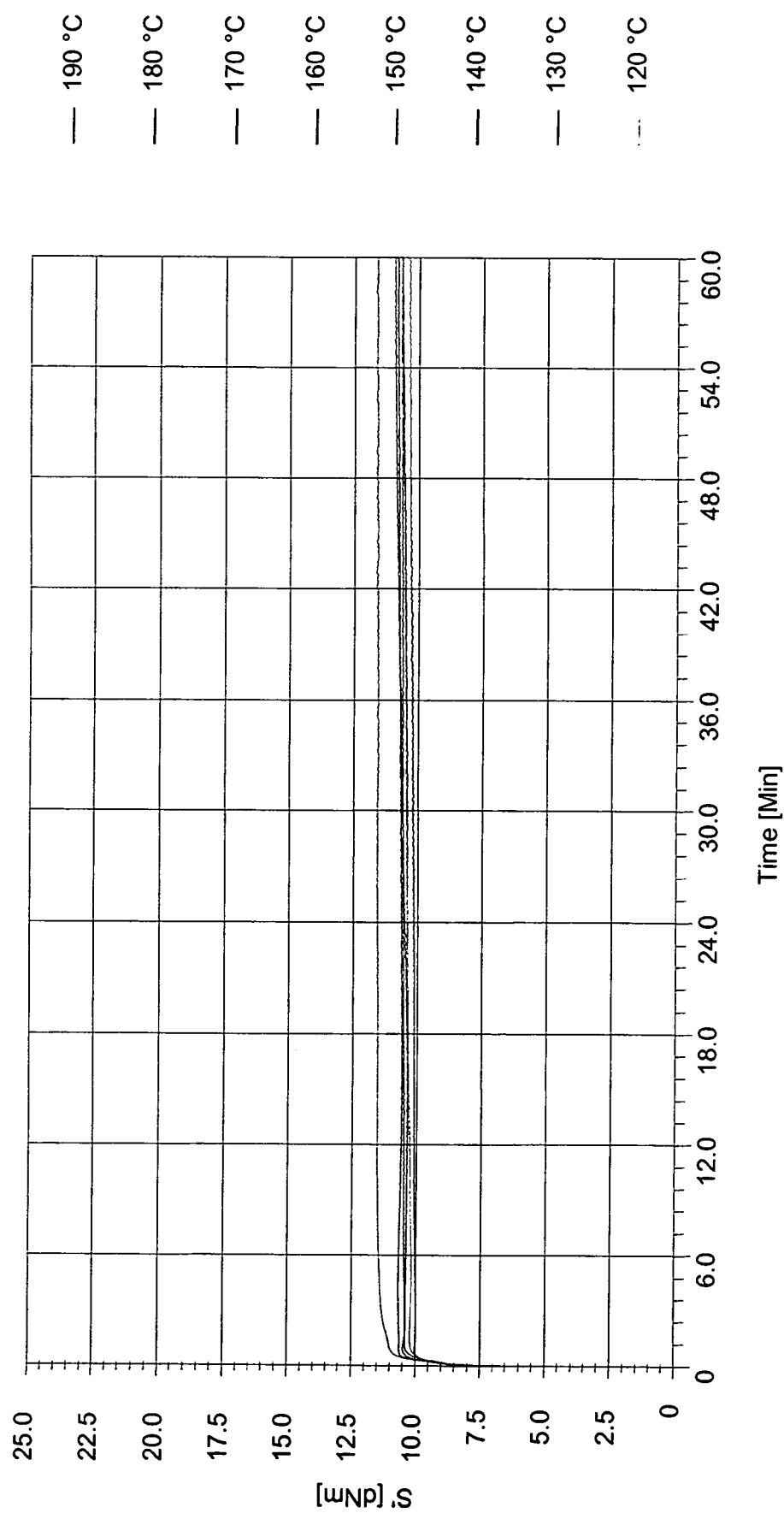
FIGURE 1: CURE PROFILE

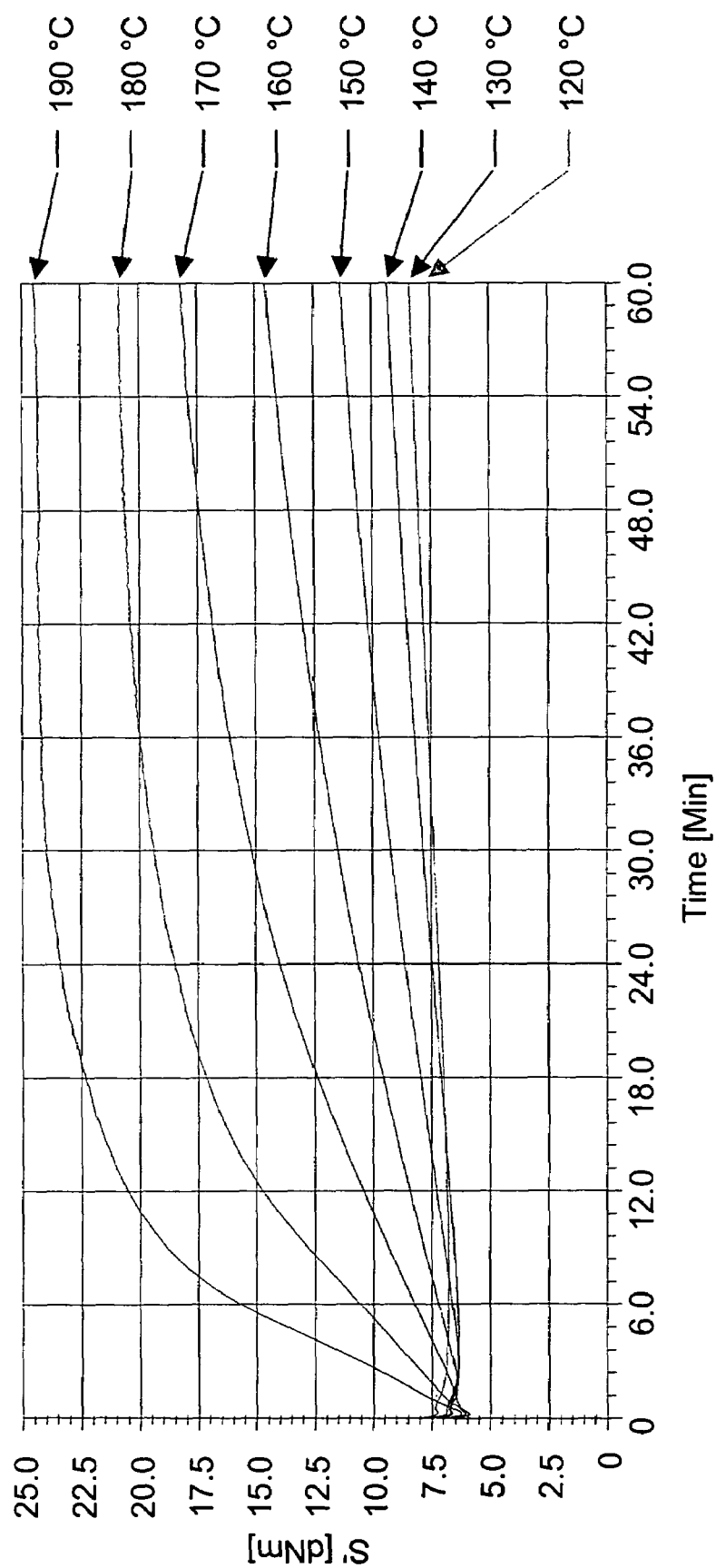
FIGURE 2: CURE PROFILE (PRIOR ART)

PROCESS FOR PRODUCING CHEMICALLY TREATED AMORPHOUS PRECIPITATED SILICA

CROSS REFERENCE TO RELATED APPLICATIONS

This application is a continuation-in-part of U.S. patent application Ser. No. 09/636,308, filed on Aug. 11, 2000 now abandoned which claims the benefit of U.S. Provisional Patent Application No. 60/203,428, filed May 10, 2000; U.S. Provisional Patent Application No. 60/172,309, filed Dec. 17, 1999; and U.S. Provisional Patent Application No. 60/149,757, filed Aug. 19, 1999.

JOINT RESEARCH AGREEMENT: PPG Industries, Inc. (now PPG Industries Ohio, Inc.) and Dow Corning Corporation executed an agreement (effective Sep. 7, 1995) for joint research and technology sharing in the field of "Treated Silicas", the field of this invention.

DESCRIPTION OF THE INVENTION

The present invention relates to methods for making chemically treated fillers. More particularly, this invention relates to processes for producing particulate or amorphous fillers having minimum carbon and mercapto contents, a minimum Silane Conversion Index, and a minimum Standard Reinforcement Index. Further, this invention relates to a process for producing a hydrophobized and functionalized filler, hereinafter referred to as a "modified filler", that improves the efficiency of producing polymeric compositions, such as in rubber compounding, and the performance of polymerized or cured products, such as but not limited to tires.

In the production of polymeric compositions, it is common to incorporate reinforcing fillers to improve the physical properties of the polymer. The surfaces of such fillers are often modified to increase the reactivity and consequently the two- and three-dimensional coupling of the filler within the polymeric composition. It is conventional in the rubber industry to incorporate carbon black and other reinforcing fillers into natural and synthetic rubber to increase the physical properties of the cured rubber vulcanizate. Fillers used to reinforce such polymeric compositions include natural and synthetic fillers.

One of the principal non-black fillers used in the rubber industry is amorphous precipitated silica. This siliceous filler is used to impart improved tensile strength, tear resistance and abrasion resistance to the rubber vulcanizate. Silica fillers are also used in combination with carbon blacks to obtain maximum mileage in passenger vehicle tires and off-the-road tires, e.g., tires for mining and logging operations and for road-building equipment. Such applications have become well established. When used as the sole reinforcing filler, silica fillers that are not well dispersed and/or coupled in the rubber do not provide the overall improved performance obtained by the use of carbon blacks alone. This is observed most readily in rubber vulcanizates used for tires, e.g., tire treads.

Various coupling agents, e.g., titanates, zirconates and silanes, have been suggested for use with fillers when such fillers are incorporated into polymeric compositions, e.g., rubber, in order to improve the performance of the rubber vulcanizate. Among the various organosilane coupling agents suggested for such use are the mercaptoalkyltrialkoxysilanes, e.g., mercaptopropyltrimethoxysilane. The high cost of mercaptoalkyltrialkoxysilanes, the irritating odors associated with the neat materials and the time and energy required to mix them into rubber compositions have deterred the more general use of siliceous fillers as the principal reinforcing filler in large volume rubber applications.

One drawback in using alkoxysilanes as coupling agents for silica fillers is that they produce off-gases. In particular, hydrolysis of the alkoxy group(s) results in the release of alcohol some of which is retained in the surrounding elastomer matrix. The portion of the alcohol retained in the surrounding elastomer matrix can result in porous zones or blisters which can form surface defects in the resulting formed rubber article and/or can impair the dimensional stability of treads during extrusion and tire building. This evolution and off-gassing of alcohol continues through the life of a product manufactured from an elastomer compounded with alkoxysilane coupling agents.

Bis(alkoxysilylalkyl)-polysulfides can be used in place of mercaptoalkyltrialkoxysilanes. Preparation of silica-filled rubber compositions using bis(alkoxysilylalkyl)-polysulfides generally need to be performed within narrow temperature operating ranges. The mixing temperature should to be high enough for the silica-silane reaction to take place rapidly but low enough to avoid an irreversible thermal degradation of the polysulfane function of the coupling agent and premature curing (scorch) of the rubber mixture. These limitations can result in decreased production and increased expense to achieve acceptable dispersion of the silica in the rubber matrix.

It has now been discovered that an improved modified filler, e.g., a particulate or amorphous inorganic oxide, that is characterized by a carbon content of greater than 1 wt. %, a mercapto content of greater than 0.15 wt. %, a Silane Conversion Index (described hereinafter) of at least 0.3, and a Standard Reinforcement Index (also described hereinafter) of 4 or more can be prepared. The modified filler of the present invention can be produced by utilizing a certain combination of functionalizing and hydrophobizing agents in an aqueous suspension of inorganic oxide having a pH of 2.5 or less and treating the acidic aqueous suspension of modified fillers with acid neutralizing agents to increase the pH of the suspension to a range of from 3.0 to 10.

As used herein, a functionalizing agent is a reactive chemical which can cause an inorganic oxide to be covalently bonded to the polymeric composition in which it is used. A hydrophobizing agent is a chemical which can bind to and/or be associated with an inorganic oxide to the extent that it causes a reduction in the affinity for water of the inorganic oxide while increasing the inorganic oxide's affinity for the organic polymeric composition in which it is used.

The aforementioned Standard Reinforcement Index (SRI) of at least 4 or greater indicates a modification of the interaction or bonding between the components of the filler-polymer composition. Specifically, there is a stronger interaction between the filler and polymer and/or the polymer and polymer than usually present for a given amount of interaction between filler and filler. Alternatively stated, there is a weaker interaction between the filler and filler than usually present for a given amount of interaction between filler and polymer and/or polymer and polymer. Appropriate modifications of these interactions in a rubber composition have been reported to result in better tire performance, e.g., improved treadwear life, lower rolling resistance, better traction on snow and lower noise generation. In addition to the improved properties, the modified filler has the benefit of requiring less time and energy to get incorporated into the polymeric composition.

BRIEF DESCRIPTION OF THE DRAWINGS

FIG. 1 is a graph of the cure profile for compositions of Example 17; and

FIG. 2 is a graph of the cure profile for comparative compositions of Example 17.

DETAILED DESCRIPTION OF THE INVENTION

Other than in the operating examples, or where otherwise indicated, all numbers expressing quantities, ratios, ranges, etc. used herein are to be understood as modified in all instances by the term "about".

The modified filler of the present invention can be produced by any method that results in such a filler, i.e., an inorganic oxide, having a carbon content of greater than 1 wt. %, or at least 1.5 wt. %, or at least 2.0 wt. %; a mercapto content of greater than 0.15 wt. %, or at least 0.3 wt. %, or at least 0.5 wt. %; a Silane Conversion Index, of at least 0.3, or at least 0.4, or at least 0.5 and a Standard Reinforcement Index of at least 4.0, or at least 4.5, or at least 5.0. The modified filler of the present invention can also be characterized by a Tensile Stress at 300% elongation of at least 6.2, or at least 7.0, or at least 7.5, or at least 8.0. The modified filler of the present invention can further be characterized by a Brunauer-Emmett-Teller (BET) single point surface area of from 20 to 350 $m^2/g$, or from 40 to 300 $m^2/g$, or from 100 to 200 $m^2/g$, a pH of from 5 to 10, or from 5.5 to 9.5, or from 6.0 to 9.0, or a pH of from 6.5 to 7.5 or the pH of the product may range between any combination of these values, inclusive of the recited ranges; a Soxhlet Extractable percent carbon of less than 30 percent, or less than 25 percent, or less than 20 percent, e.g., 15 percent. The methods for determining the afore-stated characteristics of the modified filler are described in Example 15.

A wide variety of fillers known to a skilled artisan can be used to prepare the modified filler of the present invention. Suitable fillers can include but are not limited to inorganic oxides selected from precipitated silica, colloidal silica or mixtures thereof. In addition, the inorganic oxide can be a material which is suitable for use in the various molding, compounding or coating processes including but not limited to injection molding, lamination, transfer molding, compression molding, rubber compounding, coating (such as dipping, brushing, knife coating, roller coating, silk screen coating, printing, spray coating and the like), casting, and the like.

In a non-limiting embodiment, the inorganic oxide used to produce the modified filler of the present invention can be precipitated silica of the type commonly employed for compounding with rubber. Various commercially available silica materials can be used in this invention. In alternate non-limiting embodiments, the silica can include silica commercially available from PPG Industries under the Hi-Sil trademark with designations 210, 243, etc; silica available from Rhone-Poulenc, with, for example, designations of Z1165MP and Z165GR; and silica available from Degussa AG with, for example, designations VN2 and VN3, etc.

The precipitated silica used to produce the modified filler of the present invention can be prepared by various methods known to one having ordinary skill in the art. In a non-limiting embodiment, the precipitated silica can be prepared by acidic precipitation from solutions of silicates, e.g., sodium silicate. The method of preparing the precipitated silica can be selected based on the desired properties of the silica, such as surface area and particle size required for a given application.

In alternate non-limiting embodiments of the present invention, the BET surface area of the precipitated silica used in preparing the modified filler of the present invention will generally be within a range of from 50 $m^2/g$ to 1000 $m^2/g$, or from 100 $m^2/g$ to 500 $m^2/g$.

In alternate non-limiting embodiments, the precipitated silica used to form the modified filler can be in the form of an aqueous suspension from production stages that precede the drying step, such as a slurry formed during precipitation or as a re-liquefied filter cake; or the suspension can be formed by re-dispersing dried silica into an aqueous and/or organic solvent. The concentration of hydrophilic precipitated silica in the aqueous and/or organic suspension is not critical and can be within a range of from 1 to 90 wt. %, or, the concentration of hydrophilic precipitated silica can be within a range of from 1 to 50 wt. %, or from 1 to 20 wt. %.

The Silane Conversion Index can be defined by the equation $T^3/(T^1+T^2+T^3)$. The values for $T^1$, $T^2$ and $T^3$ can be determined by solid state $^{29}Si$ NMR and represent reacted silane units. The Silane Conversion Index can provide an indication of the degree of reaction or crosslinking of the silanes on adjacent Si atoms and with each other. In general, the higher the index number, the greater the amount of crosslinking amongst the silane, silica surface and adjacent silanes. $T^1$ represents a silane unit chemically bonded at one site to either the silica surface or another silane. $T^2$ represents a silane unit chemically bonded at two sites to either a Si atom on the silica surface and to one adjacent silane, two adjacent silanes or to two adjacent surface Si atoms, i.e., partially crosslinking structures. $T^3$ represents a silane unit chemically bonded at three sites to either a Si atom on the silica surface and two adjacent silanes, two Si atoms and one silane or three silane units.

It is believed that an Organometallic Reactant Conversion Index, comparable to the Silane Conversion Index, can be developed and used by those skilled in the coupling agent art to provide an indication of the degree of reaction or crosslinking of zirconates and/or titanates (alone or in combination with silanes) with the inorganic oxide and themselves.

The Standard Reinforcement Index can be determined using a Standard Compounding Protocol. The Standard Compounding Protocol described herein does not include the addition of free or unbounded coupling agents to the rubber batch. Typically, the addition of such coupling agents to a rubber batch can require more time for mixing by the compounder.

The organic polymeric compositions, e.g., plastics and/or resin, in which the modified filler can be present include essentially any organic plastic and/or resin. Included in this definition are rubber compounds. Such polymers are described in *Kirk Othmer Encyclopedia of Chemical Technology*, Fourth Edition, 1996, Volume 19, pp 881-904, which description is herein incorporated by reference. In a non-limiting embodiment, the modified filler can be admixed with the polymer or the polymerizable components thereof while the physical form of the polymer or polymerizable components is in any liquid or compoundable form such as a solution, suspension, latex, dispersion, and the like. The polymeric compositions containing the modified filler may be milled, mixed, molded and cured, by any manner known in the art, to form a polymeric article. In a non-limiting embodiment, the polymeric article can have dispersed therein from 10 to 150 parts per 100 parts polymer of modified filler. Suitable polymers can include but are not limited to thermoplastic and thermosetting resins, rubber compounds and other polymers having elastomeric properties.

The polymers can include alkyd resins, oil modified alkyd resins, unsaturated polyesters, natural oils (e.g., linseed, tung, soybean), epoxides, nylons, thermoplastic polyester (e.g., polyethyleneterephthalate, polybutyleneterephthalate), polycarbonates, i.e., thermoplastic and thermoset, polyethylenes, polybutylenes, polystyrenes, polypropylenes, ethylene propylene co- and terpolymers, acrylics (homopolymer and copolymers of acrylic acid, acrylates, mathacrylates, acrylamides, their salts, hydrohalides, etc.), phenolic resins, polyoxymethylene (homopolymers and copolymers), polyurethanes, polysulfones, polysulfide rubbers, nitrocelluloses, vinyl butyrates, vinyls (vinyl chloride and/or vinyl acetate containing polymers), ethyl cellulose, the cellulose acetates and butyrates, viscose rayon, shellac, waxes, ethylene copolymers (e.g., ethylene-vinyl acetate copolymers, ethylene-acrylic acid copolymers, ethyleneacrylate copolymers), organic rubbers and the like.

The amount of modified filler that can be used in a polymeric composition can vary. In a non-limiting embodiment, the amount of modified filler can be from 5 up to 70 wt. %, based on the total weight of the plastic composition. For example, the typical amount of modified filler used in ABS (acrylonitrile-butadiene-styrene) copolymer can be from 30 to 60 wt. %, acrylonitrile-styrene-acrylate copolymer can be from 5 to 20 wt. %, aliphatic polyketones can be from 15 to 30 wt. %, alkyds resins (for paints and inks) can be from 30 to 60 wt. %, thermoplastic olefins can be from 10 to 30 wt. %, epoxy resins can be from 5 to 20 wt. %, ethylene vinylacetate copolymer can be up to 60 wt. %, ethylene ethyl acetate copolymer can be up to 80 wt. %, liquid crystalline polymers (LCP) can be from 30 to 70 wt. %, phenolic resins can be from 30 to 60 wt. % and in polyethylene the amount can be greater than 40 wt. %.

In a non-limiting embodiment, the polymer can be an organic rubber. Non-limiting examples of such rubbers can include but are not limited to natural rubber; those formed from the homopolymerization of butadiene and its homologues and derivatives such as: cis-1,4-polyisoprene; 3,4-polyisoprene; cis-1,4-polybutadiene; trans-1,4-polybutadiene; 1,2-polybutadiene; and those formed from the copolymerization of butadiene and its homologues and derivatives with one or more copolymerizable monomers containing ethylenic unsaturation such as styrene and its derivatives, vinyl-pyridine and its derivatives, acrylonitrile, isobutylene and alkyl-substituted acrylates such as methylmethacrylate. Further non-limiting examples can include styrene-butadiene copolymer rubber composed of various percentages of styrene and butadiene and employing the various isomers of butadiene as desired (hereinafter "SBR"); terpolymers of styrene, isoprene and butadiene polymers, and their various isomers; acrylonitrile-based copolymer and terpolymer rubber compositions; and isobutylene-based rubber compositions; or a mixture thereof, as described in, for example, U.S. Pat. Nos. 4,530,959; 4,616,065; 4,748,199; 4,866,131; 4,894,420; 4,925,894; 5,082,901; and 5,162,409.

Non-limiting examples of suitable organic polymers can include copolymers of ethylene with other high alpha olefins such as propylene, butene-1 and pentene-1 and a diene monomer. The organic polymers can be block, random, or sequential and can be prepared by methods known in the art such as but not limited to emulsion (e.g. e-SBR) or solution polymerization processes (e.g., s-SBR). Further non-limiting examples of polymers for use in the present invention can include those which are partially or fully functionalized including coupled or star-branched polymers. Additional non-limiting examples of functionalized organic rubbers can include polychloroprene, chlorobutyl and bromobutyl rubber as well as brominated isobutylene-co-paramethylstyrene rubber. In a non-limiting embodiment, the organic rubber can be polybutadiene, s-SBR and mixtures thereof.

In a non-limiting embodiment, the polymeric composition can be a curable rubber. The term "curable rubber" is intended to include natural rubber and its various raw and reclaimed forms as well as various synthetic rubbers. In alternate non-limiting embodiments, curable rubber can include combinations of SBR and butadiene rubber (BR), SBR, BR and natural rubber and any other combinations of materials previously disclosed as organic rubbers. In the description of this invention, the terms "rubber", "elastomer" and "rubbery elastomer" can be used interchangeably, unless indicated otherwise. The terms "rubber composition", "compounded rubber" and "rubber compound" are used interchangeably to refer to rubber which has been blended or mixed with various ingredients and materials, and such terms are well-known to those having skill in the rubber mixing or rubber compounding art.

The modified filler of the present invention can be prepared using a variety of methods known to one having ordinary skill in the art. In alternate non-limiting embodiments, the modified filler can be prepared by using step A alone or both steps A and B for preparing hydrophobic silica and fumed silica as disclosed in U.S. Pat. Nos. 5,908,660 and 5,919,298, respectively, which relevant disclosure is incorporated herein by reference, with the following changes. The amount of acid used results in a pH of 2.5 or less in the aqueous suspension, or, a pH of 2.0 or less, or, a pH of 1.0 or less, or a pH of 0.5 or less; the modifying chemical used is a combination of mercaptoorganometallic reactant and a non-sulfur containing organometallic compound, which is referred to hereinafter as non-sulfur organometallic compound, in a weight ratio of the mercaptoorganometallic reactant to the non-sulfur organometallic compound of at least 0.05:1, or from 0.05:1 to 10:1, or from 0.1:1 to 5:1, or from 0.2:1 to 2:1, or from 0.5:1 to 1:1, or the weight ratio can range between any combination of these values, inclusive of the recited values; and after the chemical treatment reaction is completed, the acidity (either added or generated in situ by the hydrolysis of halogenated organometallic compounds) is neutralized. In a non-limiting embodiment, after completing the chemical treatment reaction, the pH of the resulting aqueous suspension is increased to a pH range of from 3 to 10. The neutralizing agents can be selected from a wide variety of such materials that are known in the art to increase the pH of an acidic solution. The neutralizing agent should be selected such that the properties of the modified filler are not adversely affected. Non-limiting examples of suitable neutralizing agents can include but are not limited to sodium hydroxide, potassium hydroxide, ammonium hydroxide and sodium bicarbonate. In another non-limiting embodiment, neutralization of the modified filler can be accomplished by adding gaseous ammonia to the aqueous solution during spray drying.

The acid used in step (A) can be selected from a wide variety of acids, including organic and/or inorganic acids. In a non-limiting embodiment, the acid can be inorganic. Non-limiting examples of suitable acids include but are not limited to hydrochloric acid, hydrobromic acid, hydroiodic acid, sulfuric acid, nitric acid, phosphoric acid, and benzenesulfonic acid. One acid or a mixture of two or more compatible acids can be employed as desired. In a non-limiting embodiment, when the organometallic reactant is a chlorosilane, the amount of acid used can be generated in situ by hydrolysis of the chlorosilane or the reaction of the chlorosilane directly with hydroxyls of the inorganic oxide.

The temperature at which step (A) is conducted is not critical and can be within the range of from 20° C. to 250° C., although somewhat lesser or somewhat greater temperatures can be used when desired. The reaction temperature will depend on the reactants used, e.g., the organometallic compound(s), the acid and, if used, a co-solvent. In a non-limiting embodiment, step (A) is conducted at temperatures in the range of from 30° C. to 150° C. In another non-limiting embodiment, step (A) can be conducted at the reflux temperature of the slurry used in step (A).

In the afore-described reaction, the modifying chemical or coupling agent can be a combination of functionalizing agent(s) in place of mercaptoorganometallic compound and hydrophobizing agent(s) in place of a non-sulfur organometallic compound. The combination of functionalizing and hydrophobizing agents can be used in the same weight ratios specified for the combination of mercaptoorganometallic compound to the non-sulfur organometallic compound. Non-limiting examples of reactive groups that the functionalizing agent can contain include, but are not limited to, vinyl, epoxy, glycidoxy and (meth)acryloxy. Further non-limiting examples can include sulfide, polysulfide and mercapto groups provided they are not associated with the reactants represented by chemical formulas I and VI, included herein. As the hydrophobizing agents, suitable materials can include, but are not limited to, chemicals such as natural or synthetic fats and oils and the non-sulfur organometallic compounds represented by chemical formulae II, III, IV, V and mixtures of such hydrophobizing agents.

The initial step of contacting the acidic aqueous suspension of inorganic oxide with a combination of mercaptoorganometallic compound and non-sulfur organometallic compound, such as a non-sulfur organosilicon compound, can further include adding a water miscible solvent in amounts sufficient to facilitate their reaction with the inorganic oxide. The solvent can act as a phase transfer agent speeding-up the interaction of the combination of hydrophobic sulfur and non-sulfur organometallic compounds with the hydrophilic inorganic oxide. In alternate non-limiting embodiments, when water-miscible organic solvent is used, the amount of the water-miscible organic solvent can comprise at least 5 wt. % of the aqueous suspension, or from 15 to 50 wt. %, or from 20 to 30 wt. % of the aqueous suspension, or the wt. % can vary between any combination of these values, inclusive of the recited values. Non-limiting examples of suitable water-miscible solvents can include but are not limited to alcohols such as ethanol, isopropanol and tetrahydrofuran. In a non-limiting embodiment, isopropanol can be used as the water-miscible organic solvent.

In alternate non-limiting embodiments, surfactant can be used in the initial step, either in combination with the water-miscible organic solvent or in place of the water-miscible organic solvent, in an amount sufficient to facilitate the chemical modification of the inorganic oxide by the mercaptoorganometallic compound and the non-sulfur compound. The surfactant can be selected from nonionic, anionic, cationic, amphoteric or a mixture of such surfactants. The surfactant can be selected such that it does not have an adverse effect on the performance of the resulting chemically modified inorganic oxide for its intended use. In alternate non-limiting embodiments, when used, the surfactant can be present in an amount of from 0.05 to 10 wt. % of the aqueous suspension, or, from 0.1 to 5 wt. %, or from 0.1 to 3 wt. %, or the wt. % can vary between any combination of these values, inclusive of the recited values.

Non-limiting examples of suitable surfactants can include but are not limited to alkylphenolpolyglycol ethers, e.g., p-octylphenolpolyethyleneglycol (20 units) ether, p-nonylphenolpolyethyleneglycol (20 units) ether, alkylpolyethyleneglycol ethers, e.g., dodecylpolyethyleneglycol (20 units) ether, polyglycols, e.g., polyethyleneglycol 2000, alkyltrimethylammonium salts, e.g., cetyltrimethylammonium chloride (or bromide), dialkyldimethylammonium salts, e.g., dilauryldimethylammonium chloride, alkylbenzyltrimethylammonium salts, alkylbenzenesulfonates, e.g., sodium p-dodecylbenzenesulfonate, sodium p-nonylbenzenesulfonate, alkylhydrogen sulfates, e.g., lauryl hydrogen sulfate, and alkyl sulfates, e.g., lauryl sulfate. In a non-limiting embodiment, the surfactant can include a polysiloxane polymer or copolymer having an allyl end blocked polyethylene oxide.

In a non-limiting embodiment, the mercaptoorganometallic compound used to produce the modified filler of the present invention can be represented by the following graphic formula I:

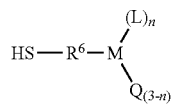

$$HS-R^6-M\begin{matrix}(L)_n\\ \\Q_{(3-n)}\end{matrix}$$ I wherein M can be silicon, L can be halogen or $-OR^7$, Q can be hydrogen, $C_1$-$C_{12}$ alkyl, or halosubstituted $C_1$-$C_{12}$ alkyl, $R^6$ can be $C_1$-$C_{12}$ alkylene, $R^7$ can be $C_1$-$C_{12}$ alkyl or alkoxyalkyl containing from 2 to 12 carbon atoms, said halogen or (halo) groups being chloro, bromo, iodo or fluoro, and n can be 1, 2 or 3. In a further non-limiting embodiment, $R^6$ can be $C_1$-$C_3$ alkylene, e.g., methylene, ethylene, and propylene, $R^7$ can be $C_1$-$C_4$ alkyl, e.g., methyl and ethyl, L can be $OR^7$, and n can be 3. In another non-limiting embodiment, mercaptoorganometallic reactants having two mercapto groups can be used.

In alternate non-limiting embodiments, mercaptoorganometallic compounds in which the mercapto group is blocked, i.e., the mercapto hydrogen atom is replaced by another group, can be used. The blocked mercaptoorganometallic compounds can have an unsaturated heteroatom or carbon bound directly to sulfur via a single bond. Non-limiting examples of blocking groups can include but are not limited to thiocarboxylate ester, dithiocarbamate ester, thiosulfonate ester, thiosulfate ester, thiophosphate ester, thiophosphonate ester, thiophosphinate ester, etc.

In a non-limiting embodiment, when reaction of the mixture to couple the filler to the polymer is desired, a deblocking agent can be present in the mixture to deblock the blocked mercaptoorganometallic compound. If water and/or alcohol are present in the mixture, a catalyst, e.g., tertiary amines, Lewis acids or thiols, can be used to initiate and promote the loss of the blocking group by hydrolysis or alcoholysis to liberate the corresponding mercaptoorganometallic compounds. Various procedures for preparing and using such compounds, e.g., blocked mercaptosilanes, are known in the art, and can include those disclosed in PCT Application No. WO 99/09036, and U.S. Pat. Nos. 3,692,812 and 3,922,436, which relevant portions are incorporated herein by reference.

Non-limiting examples of suitable mercaptoorganometallic compound(s) can include but are not limited to mercaptomethyltrimethoxysilane, mercaptoethyltrimethoxysilane, mercaptopropyltrimethoxysilane, mercaptomethyltriethoxysilane, mercaptoethyltripropoxysilane, mercaptopropyltriethoxysilane, (mercaptomethyl)dimethylethoxysilane, (mercaptomethyl)methyldiethoxysilane, 3-mercaptopropylmethyldimethoxysilane and mixtures thereof. In alternate non-limiting embodiments, the mercaptoorganometallic compound can include mercaptopropyltrimethoxysilane, mercaptopropyltriethoxysilane or mixtures thereof.

Non-limiting examples of suitable blocked mercaptosilanes can include but are not limited to 2-triethoxysilyl-1-ethyl thioacetate, 3-trimethoxy-silyl-1-propyl thiooctoate, bis-(3-triethoxysilyl-1-propyl)-methyldithiophosphonate, 3-triethoxysilyl-1-propyldimethylthiophosphinate, 3-triethoxysilyl-1-propylmethylthiosulfate, 3-triethoxysilyl-1-propyltoluenethiosulfonate and mixtures thereof.

In alternate non-limiting embodiments, the non-sulfur organometallic compounds that can be used to produce the modified filler of the present invention can include at least one non-sulfur organometallic compound or a mixture of non-sulfur organometallic compounds selected from the group consisting of: organometallic compound(s) represented by formula II:

$$R^1_a MX_{(4-a)} \quad \text{II}$$

organometallic compound(s) represented by formula III:

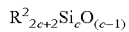
$$R^2_{2c+2} Si_c O_{(c-1)} \quad \text{III}$$

organometallic compound(s) represented by the formula IV:

$$R^3_{2d} Si_d O_d \quad \text{IV}$$

and organometallic compound(s) represented by formula V:

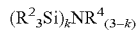
$$(R^2_3 Si)_k NR^4_{(3-k)} \quad \text{V}$$

wherein each M can be independently silicon, titanium or zirconium; each $R^1$ can be independently a hydrocarbon group of from 1 to 18 carbon atoms or $R^1$ can be an organofunctional hydrocarbon group of from 1 to 12 carbon atoms where, for example, the functionality can be amino, carboxylic acid, carbinol ester, or amido; each X can be independently selected from the group consisting of halogen, amino, alkoxy groups of from 1 to 12 carbon atoms and acyloxy groups of from 1 to 12 carbon atoms, a can be the integer 1, 2 or 3; each $R^2$ can be independently halo, hydroxy, or a hydrocarbon group containing from 1 to 18 carbon atoms with the proviso that at least 50 mole percent of the $R^2$ substituents can be hydrocarbon groups containing from 1 to 18 carbon atoms, c can be an integer from 2 to 10,000; each $R^3$ can be independently halo, hydroxy, or a hydrocarbon group containing from 1 to 18 carbon atoms and d can be an integer from 3 to 20; each $R^4$ can be independently hydrogen or a hydrocarbon group containing from 1 to 18 carbon atoms and k can be 1 or 2; and the halogen or (halo) groups can be selected from chloro, bromo, iodo or fluoro. In the definition of the substituents shown in formulae II, III, IV and V, like symbols have the same meaning unless stated otherwise.

In alternate non-limiting embodiments, in formula II each $R^1$ can be a saturated or unsaturated monovalent hydrocarbon group or a substituted or non-substituted monovalent hydrocarbon group. $R^1$ can be alkyl groups such as methyl, ethyl, propyl, iso-propyl, iso-butyl, t-butyl, n-butyl, pentyl, hexyl, heptyl, octyl, nonyl, decyl, and dodecyl; alkenyl groups such as vinyl, allyl, and hexenyl; substituted alkyl groups such as chloromethyl, 3,3,3-trifluoropropyl, and 6-chlorohexyl; cycloalkyl groups, such as cyclohexyl and cyclooctyl; aryl groups such as phenyl and naphthyl; and substituted aryl groups such as benzyl, tolyl and ethylphenyl.

In further alternate non-limiting embodiments, when X is a halogen in formula II, the halogen can be chloro; when X is an alkoxy group, X can be methoxy, ethoxy, and propoxy; when X is an acyloxy group, X can be acetoxy. In another non-limiting embodiment, each X can be selected from chloro and methoxy.

The viscosity of the afore-described organometallic compounds is not limiting and can range from that of a fluid to a gum. Generally, higher molecular weight organometallic compounds should be cleaved by the acidic conditions of the chemical modification step allowing them to react with the hydrophilic inorganic oxide.

In non-limiting embodiments, in formulae III, IV and V, each $R^2$, $R^3$ and $R^4$ can be the same as the hydrocarbon groups described for $R^1$. For purposes of the present invention, when the organometallic reactant is an organosilicon reactant, the silicon is considered to be a metal.

In further non-limiting embodiments, the non-sulfur organometallic compound(s) can be represented by formulae II, III, IV, V or a mixture of said organometallic compounds wherein each M can be silicon. In a non-limiting embodiment, the non-sulfur organometallic compound can be represented by formula II wherein $R^1$ can be $C_1$-$C_6$ alkyl, X can be chloro and a can be 2.

Non-limiting examples of suitable organosilicon compounds can include, but are not limited to, compounds and mixtures of compounds selected from diethyldichlorosilane, allylmethyldichlorosilane, methylphenyldichlorosilane, phenylethyldiethoxysilane, 3,3,3-trifluoropropylmethyldichlorosilane, trimethylbutoxysilane, sym-diphenyltetramethyldisiloxane, trivinyltrimethyl-cyclotrisiloxane, octamethylcyclotetrasiloxane, hexaethyldisiloxane, pentylmethyldichlorosilane, divinyidipropoxysilane, vinyidimethylchlorosilane, vinylmethyldichlorosilane, vinyldimethylmethoxysilane, trimethylchlorosilane, trimethylmethoxysilane, trimethylethoxysilane, methyltrichlorosilane, methyltrimethoxysilane, methyltriethoxysilane, hexamethyldisiloxane, hexenylmethyldichlorosilane, hexenyldimethylchlorosilane, dimethylchlorosilane, dimethyldichlorosilane, dimethyldimethoxysilane, dimethyldiethoxysilane, hexamethyldisilazane, trivinyltrimethylcyclotrisilazane, polydimethylsiloxanes comprising 3 to about 20 dimethylsiloxy units and trimethylsiloxy or hydroxydimethylsiloxy end blocked poly(dimethylsiloxane)polymers having an apparent viscosity within the range of from 1 to 1000 in mPa·s at 25° C.

Non-limiting examples of suitable organotitanium compounds can include, but are not limited to, tetra($C_1$-$C_{18}$) alkoxy titanates, methyl triethoxy titanium (iv), methyl titanium (iv) triisopropoxide, methyl titanium (iv) tributoxide, methyl titanium (iv) tri-t-butoxide, isopropyl titanium (iv) tributoxide, butyl titanium (iv) triethoxide, butyl titanium (iv) tributoxide, phenyl titanium (iv) triisopropoxide, phenyl titanium (iv) tributoxide, phenyl titanium (iv) triisobutoxide, [Ti(CH$_2$Ph)$_3$(NC$_5$H$_{10}$)] and [Ti(CH$_2$SiMe$_3$)$_2$(NEt$_2$)$_2$].

Non-limiting examples of suitable organozirconium compounds can include, but are not limited to, tetra($C_1$-$C_{18}$) alkoxy zirconates, phenyl zirconium (iv) trichloride, methyl zirconium (iv) trichloride, ethyl zirconium (iv) trichloride, propyl zirconium (iv) trichloride, methyl zirconium (iv) tribromide, ethyl zirconium (iv) tribromide, propyl zirconium (iv) tribromide, chlorotripentyl zirconium (iv). In alternate non-limiting embodiments, zirconium compounds similar to those described above for the organotitanium compounds and vice-versa are also contemplated.

The amount of mercaptoorganometallic compound and non-sulfur organometallic compound used in the afore-described chemical modification process can be that amount which is sufficient to produce a modified filler characterized by a carbon content of greater than 1 wt. %, a mercapto content of greater than 0.15 wt. %, a Silane Conversion Index of at least 0.3 and a Standard Reinforcement Index of at least 4.0. Such an amount is referred to herein as a coupling amount, i.e., an amount sufficient to bind to the filler and enable the now modified filler to bind to the polymeric composition.

In alternate non-limiting embodiments, the weight ratio of mercaptoorganosilane to non-sulfur organometallic compound can vary from at least 0.05:1, or from 0.05:1 to 10:1, or from 0.1:1 to 5:1, or from 0.2:1 to 2:1, or from 0.5:1 to 1:1 or the weight ratio can vary between any combination of these values, inclusive of the recited ranges. The individual organometallic reactants can be added together or sequentially in any order. In a non-limiting embodiment, the organometallic reactants can be present in an amount that provides an excess of organometallic units in relation to the hydroxyl groups available on the inorganic oxide particles for reaction. The upper limit of the amount of organometallic reactants added to the process is not critical. Excess mercaptoorganometallic compounds and non-sulfur organometallic compounds can be removed by filtration, distillation, washing with a solvent, or other known separation techniques.

In alternate non-limiting embodiments, the mercaptoorganometallic reactant can be replaced by a combination of a mercaptoorganometallic and a different sulfur-containing organometallic compound in a weight ratio of mercaptoorganometallic compound to sulfur-containing organometallic compound of from at least greater than 1:1, or 1.01:1, or from 1.01:1 to 100:1, or from 5:1 to 50:1, or from 10:1 to 30:1 or the weight ratio can vary between any combination of these values, inclusive of the recited values. In general, any sulfur-containing organometallic compound (other than the mercaptoorganometallic compound represented by formula I), that can function as a coupling agent in the vulcanization of a filler containing rubber, can be suitable for use in the present invention.

Non-limiting examples of suitable sulfur-containing organometallic compounds can include bis(alkoxysilylalkyl)-polysulfides as described in U.S. Pat. Nos. 3,873,489 and 5,580,919, which relevant portions of the disclosures are incorporated herein by reference, and are represented by the following formula VI:

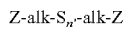

VI in which alk can be a divalent hydrocarbon radical having from 1 to 18, or 1 to 6, or 2 to 3, carbon atoms; n' can be a whole number from 2 to 12, or from 2 to 6, or from 3 to 4; and Z can be:

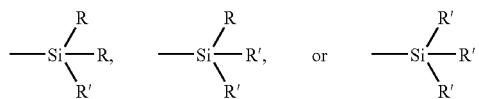

wherein R can be an alkyl group having from 1 to 4 carbon atoms or phenyl, and R' can be an alkoxy group having from 1 to 8, or from 1 to 4, or from 1 to 2, carbon atoms, a cycloalkoxy group with from 5 to 8 carbon atoms, or a straight or branched chain alkylmercapto group with from 1 to 8 carbon atoms. The R and R' groups can be the same or different. The divalent alk group can be straight or branched chain, a saturated or unsaturated aliphatic hydrocarbon group or a cyclic hydrocarbon group. In a non-limiting embodiment, a high purity organosilane disulfides as disclosed in U.S. Pat. No. 5,580,919 which requires that 80 percent of n' in formula I is 2, can be used.

Non-limiting examples of suitable bis(alkoxysilylalkyl)-polysulfides can include: the bis(2-trialkoxysilylethyl)-polysulfide in which the trialkoxy group can be trimethoxy, triethoxy, tri(methylethoxy), tripropoxy, tributoxy, etc. up to trioctyloxy and the polysulfide can be the di-, tri-, tetra-, penta-, and hexasulfide. The corresponding bis(3-trialkoxysilylpropyl)-, bis(3-trialkoxysilylisobutyl), -bis(4-trialkoxysilylbutyl)-, etc. up to bis(6-trialkoxysilyl-hexyl)polysulfide can also be used. In non-limiting embodiments, organosilanes including the bis(3-trimethoxy-, -triethoxy-, and -tripropoxysilyl-propyl)polysulfide; such as, the di-, tri- and tetrasulfides, can be used.

Further non-limiting examples of suitable bis(alkoxysilylalkyl)-polysulfides are described in column 6, lines 5-55 of the aforesaid U.S. Pat. No. 3,873,489 and in column 11, lines 11-41 of U.S. Pat. No. 5,580,919. Non-limiting representative examples of such compounds are: 3,3'bis(trimethoxysilylpropyl)disulfide, 3,3'-bis(triethoxysilylpropyl)tetrasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, and 3,3'-bis(trioctoxysilylpropyl)tetrasulfide and mixtures thereof. The most preferred compound is 3,3'-bis(triethoxysilylpropyl)tetrasulfide (TESPT).

TESPT is available under the trade name Si-69 from Degussa Corp. It is reported to be a mixture of 3,3'-bis(triethoxysilylpropyl)monosulfide, 3,3'-bis(triethoxysilylpropyl)disulfide, 3,3'-bis(triethoxysilylpropyl)trisulfide, 3,3'-bis(triethoxysilylpropyl)tetrasulfide and higher sulfide homologues having an average sulfide of 3.5.

In alternate non-limiting embodiments, after the chemical modifying process is essentially completed, the pH of the aqueous suspension of modified inorganic oxide can be increased from the treatment pH of 2.5 or less to a pH from 3.0 to 10.0, or to 3 or higher, or 4 or higher, or 5 or higher, or 6 or higher, and 10 or less, or 9 or less, or 8 or less, or 7 or less. The pH of the aqueous suspension can vary between any combination of these levels, including the recited levels. The pH can be increased to neutralize the added or generated acidity and produce a final product (after drying) having a pH of from 5.0 to 10.0.

In alternate non-limiting embodiments, the modified inorganic oxide can be recovered by filtering and drying or by contacting the aqueous suspension of modified inorganic oxide with a water-immiscible organic solvent at a solvent to inorganic oxide weight ratio greater than 1 to 1, or greater than 5 to 1. The modified inorganic oxide recovered in the solvent phase can be used without further treatment or dried. In a non-limiting embodiment, the present invention can include a composition comprising a slurry of the modified filler in a water-immiscible solvent. The concentration of the modified filler in the slurry can range from 1 to 90 wt. % based on the total weight of the slurry.

Non-limiting examples of suitable water-immiscible organic solvents can include low molecular weight siloxanes, such as but not limited to hexamethyldisiloxane, octamethylcyclotetrasiloxane, diphenyltetramethyldisiloxane and trimethylsiloxy end blocked polydimethylsiloxane fluids. When a siloxane is employed as a solvent, it can act both as a solvent and as a reactant with the inorganic oxide. Further non-limiting examples of suitable water-immiscible organic solvents can include aromatic hydrocarbons, such as toluene and xylene; heptane and other aliphatic hydrocarbon solvents; cycloalkanes, such as cyclohexane; ethers, such as diethylether and dibutylether; halohydrocarbon solvents, such as methylene chloride, chloroform, ethylene chloride, and chlorobenzene; and ketones, such as methylisobutylketone.

In alternate non-limiting embodiments, the water-immiscible organic solvent which can be used to contact the aqueous suspension of hydrophobic particulate inorganic oxide may or may not contain one or more materials dissolved therein. Non-limiting examples of such materials can include, but are not limited to, one or more rubbers, oil, coupling agent, antioxidant, and accelerator.

At least one benefit of the chemically treated filler of the present invention is that when compounded with a polymer, such as a rubber composition, alcohol evolution can be substantially suppressed. The reaction of the silica particle with the coupling agent of the present invention can yield the chemically treated filler of the present invention and a by-product of alcohol. For example, an ethoxy silane produces a by-product of ethanol in reaction with silica. The process of the present invention can be performed in an aqueous environment under conditions that can result in essentially complete hydrolysis of the alkoxy group(s). The alcohol by-product produced in the reaction between the coupling agent and silica can be retained in the aqueous phase. The chemically treated filler can be isolated from the aqueous phase (containing the alcohol) resulting in substantially no release of alcohol by the filler. In a non-limiting embodiment, the filler can release less than 4000 ppm alcohol. In another non-limiting embodiment, the filler can be compounded with a rubber composition in conventional amounts and the compounded rubber composition can result in substantially no release of alcohol. In a further non-limiting embodiment, the compounded rubber composition can release less than 4000 ppm alcohol. In a non-limiting embodiment, the rubber composition includes from 10 to 150 parts of filler per 100 parts of rubber composition. "Substantially no release of alcohol" and similar phrases mean that the filler and/or rubber composition do not continue to evolve alcohol; any release of alcohol from the filler and/or rubber composition is a result of alcohol physically trapped and which escapes therefrom.

In a non-limiting embodiment, a rubber composition compounded with the modified filler of the present invention and without the presence of bis(alkoxysilylalkyl)polysulfide can release at least 20% less alcohol than a rubber composition with conventional fillers and the presence of bis(alkoxysilylalkyl)polysulfide.

In a non-limiting embodiment, the modified filler of the present invention (as a powder, granule, pellet, slurry, aqueous suspension or solvent suspension) can be combined with base material, i.e., material used in the product to be manufactured, to form a mixture referred to as a master batch. In the master batch, the modified filler can be present in a higher concentration than in the final product. Aliquots of this mixture can be added to production-size quantities during mixing operations in order to aid in uniformly dispersing very small amounts of such additives to polymeric compositions, e.g., plastics, rubbers and coating compositions.

In another non-limiting embodiment, the modified filler can be combined with emulsion and/or solution polymers, e.g., organic rubber comprising solution styrene/butadiene (SBR), polybutadiene rubber or a mixture thereof, to form a master batch. In a further non-limiting embodiment, a master batch comprising a combination of organic rubber, water-immiscible solvent, modified filler and, optionally, processing oil can be formed. Such a product can be supplied by a rubber producer to a tire manufacturer. At least one benefit to the tire manufacturer of using a master batch is that the modified filler can be uniformly dispersed in the rubber, which can substantially reduce or minimize the mixing time to produce the compounded rubber. In alternate non-limiting embodiments, the master batch can contain from 10 to 150 parts of modified silica per 100 parts of rubber (phr), or from 20 to 130 phr, or from 30 to 100 phr, or from 50 to 80 phr.

In alternate non-limiting embodiments of the present invention, a polymeric article can have dispensed therein from 10 to 150 parts of modified filler per 100 parts of polymer, or from 20 to 130, or from 30 to 100, or from 50 to 80 parts of modified filler per 100 parts of polymer. The amount of modified filler can vary between any combination of these values, inclusive of the recited ranges. As described herein, the polymer can be selected from thermoplastic resins, thermosetting resins and organic rubber. In a non-limiting embodiment, the polymer can be a curable organic rubber.

Non-limiting examples of curable rubbers suitable for use in combination with the modified filler of the present invention are well-known to the skilled artisan in rubber chemistry and can include but are not limited to vulcanizable and sulfur-curable rubbers. In a further non-limiting embodiment, the curable rubber can include those materials which are typically used for mechanical rubber goods.

In another non-limiting embodiment, the modified filler of the present invention can be mixed with an uncured rubbery elastomer used to prepare the vulcanizable rubber composition by conventional means such as in a Banbury mixer or on a rubber mill at temperatures between about 100° F. and 400° F. (38° C.-200° C.). In alternate non-limiting embodiments, a vulcanizable rubber composition can contain, based on 100 parts of vulcanizable rubber polymer, from 10 to 150 parts of modified filler, or from 20 to 130 phr, or from 30 to 100 phr, or from 50 to 80 phr. Non-limiting examples of other conventional rubber additives that can be present include but are not limited to the conventional sulfur or peroxide cure systems.

At least one benefit of the chemically treated filler of the present invention can be its stability at elevated temperatures and/or the absence of curing of a rubber compounded therewith at temperatures up to at least 200° C. when mixed for at least one half minute or up to 60 minutes. In alternate non-limiting embodiments, the compounding process can be performed batchwise or continuously. In a non-limiting embodiment of the invention, the rubber composition and at least a portion of the chemically treated composition can be continuously fed into an initial portion of a mixing path to produce a blend and the blend can be continuously fed into a second portion of the mixing path.

A rubber composition compounded with the chemically treated filler of the present invention can result in improved performance properties over those of a conventional sulfur-vulcanized coupling compounded with conventional fillers and bis(alkoxysilylalkyl)-polysulfide. The improved properties can include higher 300% modulus, higher ratio of 300% to 100% modulus, lower delta G', and lower tangent delta at 60° C.

In a non-limiting embodiment, the sulfur-cure system can include 0.5 to 5 parts sulfur, 2 to 5 parts zinc oxide and 0.5 to 5 parts accelerator. In a further non-limiting embodiment, the peroxide-cure system can include 1 to 4 parts of a peroxide such as dicumyl peroxide. A wide variety of other conventional rubber additives can also be used. Non-limiting examples of suitable additives can include but are not limited to other fillers, such as carbon black, oils, plasticizers, accelerators, antioxidants, heat stabilizers, light stabilizers, zone stabilizers, organic acids, such as for example stearic acid, benzoic acid, or salicylic acid, other activators, extenders and coloring pigments. The particular compounding recipe will vary with the particular vulcanizate prepared; such recipes are known to those skilled in the art of rubber compounding.

Another benefit of the present invention can be the ability to achieve desired cure kinetics and physical properties of rubber compounded with the chemically treated filler of the present invention and certain curative components. In a non-limiting embodiment, the desired cure kinetics can include a scorch time of greater than 2.5 minutes and a cure time of less than 30 minutes (TS2 and TC90, respectively, determined according to ASTM D5289-95) with the compounded product having a 300% modulus (determined according to ASTM D412-98a) of at least 6.5 MPa. These cure kinetics and physical properties can be achievable when one or more curative components are included. Suitable curative components can include a wide variety of materials known to a skilled artisan, such as but not limited to accelerators and retardants.

Non-limiting examples of suitable accelerator compositions can include:

benzothiazoles such as:
2-mercaptobenzothiazole,
zinc 2-mercaptobenzothiazole,
2,2'-dithiobisbenzothiazole,
2-morpholinothiobenzothiazole,
2-(4-morpholinothio)-benzothiazole,
2-(4-morpholinodithio)-benzothiazole,
2-(4-morpholinothio)-5-methylbenzothiazole,
2-(4-morpholinothio)-5-chlorobenzothiazole,
2-(2,6-dimethyl-4-morpholinothio)-benzothiazole,
2-(3,6-dimethyl-4-morpholinothio)-benzothiazole,
2,2'-dibenzothiazole disulfide, and
2-mercaptobenzothiazyl disulfide;

benzothiazole sulfenamides such as:
N-cyclohexyl-2-benzothiazole sulfenamide,
N-tert-butyl-2-benzothiazole sulfenamide,
N,N'-dicyclohexyl-2-benzothiazole sulfenamide,
N,N-diisopropyl-2-benzothiazole sulfenamide,
N,N-diethyl-2-benzothiazole sulfenamide,
N-oxydiethylene-2-benzothiazole sulfenamide, and
N-oxydiethylene thiocarbamyl-N-oxydiethylene sulfenamide;

dithiocarbamates such as:
bismuth dimethyldithiocarbamate,
copper dimethyldithiocarbamate,
cadmium diethyldithiocarbamate,
lead diamyldithiocarbamate,
lead dimethyldithiocarbamate,
selenium diethyldithiocarbamate,
selenium dimethyldithiocarbamate,
tellurium diethyldithiocarbamate,
zinc dimethyldithiocarbamate,
zinc diethyldithiocarbamate,
zinc diamyldithiocarbamate,
zinc di-n-butyldithiocarbamate,
zinc dimethylpentamethylenedithiocarbamate,
piperidinium pentamethylene dithiocarbamate, 2-benzothiazyl-N,N-diethyldithiocarbamate, and
dimethylammonium dimethyldithiocarbamate;

thiomorpholines such as:
4,4'-dithiodimorpholine,
4-mercaptomorpholine,
4-mercapto-2,6-dimethylmorpholine,
4-[(4-morpholinylthio)thixomethyl]morpholine,
2,6-dimethylmorpholine sisulfide,
methyl morpholine disulfide,
propyl 2,6-dimethylmorpholine disulfide,
alkyl morpholine disulfide, and
phenyl morpholine disulfide;

thioureas such as:
trimethylthiourea,
1,3-diethylthiourea,
1,3-dibutylthiourea,
N,N'-dibutylthiourea,
dimethylethylthiourea,
diphenylthiourea, and
tetramethylthiourea;

xanthates such as:
sodium isopropylxanthate,
zinc isopropylxanthate, and
zinc dibutylxanthate;

thiuramsulfides such as:
tetramethylthiuram monosulfide,
tetramethylthiuram disulfide,
tetraethylthiuram disulfide,
tetrabutylthiuram disulfide,
tetrabenzylthiuram disulfide,
dipentamethylenethiuram tetrasulfide,
dimethyldiphenylthiuram disulfide, and
dipentamethylenethiuram monosulfide; and amines such as:
cyclohexylethylamine,
dibutylamine,
acetaldehyde-aniline condensation products,
heptaldehyde-aniline condensation products; and guanidines, such as:
N,N'-diphenylguanidine,
N,N'-di-o-tolylguanidine,
orthotolylbiguanidine,
N,N',N"-triphenylguandine, and
blends of diarylguanidines.

Non-limiting examples of suitable retardants can include at least one of:
N-(cyclohexylthio)-phthalimide,
phthalic anhydride, and
aromatic sulfenamide.

The vulcanizable rubber composition can be vulcanized or cured to a rubber vulcanizate in accordance with customary procedures known in the rubber industry. Non-limiting examples of industrial rubber vulcanizates (articles) which can be produced utilizing the modified filler of the present invention can include wire and cable jacketing, hoses, gaskets and seals, industrial and automotive drive-belts, engine mounts, V-belts, conveyor belts, roller coatings, tires and components of tires, such as vehicle tire treads, subtreads, tire carcasses, tire sidewalls, tire belt wedge, tire bead filler, and tire wire skim coat, shoe sole materials, packing rings, damping elements and many others.

The present invention is more particularly described in the following discussion of the Standard Compound Protocol, Examples and Comparative Examples which are intended as illustrative only since numerous modifications and variations therein will be apparent to those skilled in the art.

Standard Compounding Protocol

The Standard Compounding Protocol was used to prepare test samples of formulated rubber compositions containing the silica of the Examples and Comparative Examples (CE).

Part A

The following ingredients in amounts of parts per hundred parts of rubber by weight (phr) were added in the order described to a polyethylene bag held erect in a 500-milliliter (mL) plastic cup:

| Material | Amount (phr) |
| --- | --- |
| Processing oil [1] | 30.0 |
| Zinc oxide [2] | 2.5 |
| Antiozonant [3] | 2.0 |
| Stearic acid [4] | 1.0 |
| Filler Sample | 12.5 |

[1] Sundex ® 8125 aromatic hydrocarbon processing oil, obtained commercially from Sun Company, Inc., Refining and Marketing Division.
[2] Kadox ® surface treated zinc oxide, obtained commercially from Zinc Corporation of America.
[3] Wingstay ® 100 antiozonant, a mixture of diaryl p-phenylenediamines, obtained commercially from The Goodyear Tire & Rubber Co.
[4] Rubber grade stearic acid, obtained commercially from C. P. Hall.

Part B

A 1.89 liter (L) Farrel Banbury mixer (Model "BR") was used for mixing the various ingredients. Immediately prior to adding the batch ingredients to the mixer, 800 grams (g) of CV-60 grade natural rubber was put through the mixer to clean it of any residue of previous runs and increase the temperature to about 93° C. (200° F.). After removing the rubber, the mixer was cooled to about 65° C. (150° F.) before adding the ingredients to produce the rubber test sample.

A rubber composition is prepared using the test filler, the following other enumerated ingredients and the procedure described hereinafter.

| Ingredient | Amount (phr) | Time at which material was added to or ((removed from)) mixer in minutes | Rotor speed (rpm) |
| --- | --- | --- | --- |
| First Pass | | | |
| SBR Rubber [5] | 70.0 | 0 | 116 |
| BR Rubber [6] | 30.0 | 0 | 116 |
| Test Filler | 57.5 | 0.5 | 116 |
| Sample from Part A | All | 3.0 | 116 |
| Dump contents | | ((5.0)) | |
| Second Pass | | | |
| Product of First Pass | All | 0 | 77 |
| Antiozonant [7] | 2.0 | 0 | 77 |
| Petroleum Wax [8] | 1.5 | 0 | 77 |
| RM Sulfur [9] | 1.4 | 0.5 | 77 |
| TBBS [10] | 1.7 | 0.5 | 77 |
| DPG [11] | 2.0 | 0.5 | 77 |
| Dump contents | | ((4.0)) | |

[5] Solflex ® 1216 solution styrene-butadiene rubber (SBR) obtained commercially from The Goodyear Tire & Rubber Co.
[6] Budene 1207 butadiene rubber (BR) obtained commercially from The Goodyear Tire & Rubber Co.
[7] Santoflex ® 13 antiozonant, described as N-(1,3-dimethylbutyl)-N'-phenyl-p-phenylenediamine, obtained commercially from Flexsys.
[8] Okerin ® 7240 microcrystalline wax/paraffin wax blend obtained commercially from Astor Corporation.
[9] Rubber Makers (RM) sulfur, 100% active, obtained commercially from Taber, Inc.
[10] N-tert-butyl-2-benzothiazolesufenamide, obtained commercially from Monsanto.
[11] Diphenylguanidine, obtained commercially from Monsanto.

The first pass was initiated by adding the rubber, viz., SBR and BR, to the mixer and mixing for 0.5 minute at 116 rpm. The rotor speed was maintained at 116 rpm and 57.5 phr of the treated filler sample was added. After a further 1.5 minute, the ram was raised and the chute swept, i.e., the covering on the entry chute was raised and any material that was found in the chute was swept back into the mixer. After a further minute, the sample from Part A was added. After another minute, the ram was raised and the chute swept. The contents in the mixer were mixed for an additional minute to achieve a maximum temperature in the range of from 145 to 150° C. (293 to 302° F.) and to complete the first pass in the mixer. Depending upon the type of sample, the rotor speed of the mixer may be increased or decreased after 4 minutes to achieve a temperature in the foregoing range within the specified mixing period.

After completing the first pass, the temperature of the material was determined with a thermocouple to verify that it did not exceed the maximum temperature of 150° C. The removed material was weighed and sheeted in a Farrel 12 inch, two-roll rubber mill at 2.032 mm±0.127 mm (0.080 inch±0.005 inch). The resulting milled stock was cut into strips in preparation for the second pass in the mixer.

A minimum of one hour was allotted between the completion of the first pass in the mixer and the beginning of the second pass to allow the milled stock to cool. If necessary, the afore-described cleaning and warming-up procedure using CV-60 grade natural rubber was completed prior to initiating the second pass. The temperature of the mixer was adjusted to approximately 49° C. (120° F.). With the cooling water running, the second pass was initiated by adding the strips of first pass stock to the mixer operating at 77 rpm and the preweighed combination of Santoflex® 13 antiozonant and Okerin® 7240 microcrystalline wax/paraffin wax blend. After 0.5 minute, the second addition of the combination of RM Sulfur, TBBS and DPG was added. After a further 1.5 minutes, the ram was raised and the chute swept. The second pass was completed by mixing the stock an additional 2.0 minutes while maintaining the temperature at or below 125° C. (257° F.).

Part C

A Farrel 12 inch, two-roll rubber mill was heated to approximately 60° C. (140° F.). The stock from the second pass of Part B was fed into the running mill with a nip setting of 2.032 mm±0.127 mm (0.080 inch±0.005 inch). The resulting sheet was placed on a flat surface until the temperature of the sheet reached room temperature. Typically, the sheet cooled within about 30 minutes. Afterwards, the milled sheet was fed into the rubber mill with a nip setting of 3.81 mm±0.51 mm (0.15 inch±0.02 inch). The rolling bank was adjusted, if necessary, to maintain a uniform thickness. The resulting material was subjected to 16 side cuts and then 8 end passes. The rubber mill nip was adjusted to produce a sheet thickness of 2.032 mm±0.127 mm (0.080 inch±0.005 inch). The sheet stock collected off the mill was placed on a flat clean surface. Using a stencil, a rectangular sample 203.2 mm×152.4 mm (8 inches×6 inches) was cut from the sheet stock. The sample was conditioned, i.e., stored between clean polyethylene sheets and maintained for 15 to 18 hours at a temperature of 23°±2° C., and a relative humidity of 50%±5%.

After conditioning, the sample was placed in a 203.2 mm×152.4 mm×2.286 mm (8 inches×6 inches×0.09 inch) standard frame machine steel compression mold having a polished surface. The sample was cured in a 61 centimeter×61 centimeter (24 inches×24 inches) 890 kilonewton (100 ton) 4-post electrically heated compression press, for T90, i.e., the time it takes for 90 percent of the cure to occur, in accordance with ASTM D-2084, plus 5 minutes at 150° C. (302° F.) under a pressure of 13.79 megapascals (2000 pounds per square inch). Typically, curing was completed within about 10 minutes. The resulting cured rubber sheet was removed from the mold and maintained for 15 to 18 hours at a temperature of 23°±2° C. (73.4±3.6° F.), and a relative humidity of 50%±5% prior to testing in Part D.

Part D

Testing was performed in accordance with ASTM D 412-98a—Test Method A. Dumbbell test specimens were prepared using Die C. An Instron model 4204 with an automated contact extensiometer for measuring elongation was used. The cross-head speed was found to equal 508 mm/min. All calculations were done using the Series IX Automated Materials Testing software supplied by the manufacturer. The Reinforcement Index equals the Tensile Stress at 300% elongation (in MPa) divided by the Tensile Stress at 100% elongation (in MPa). When the samples were prepared using the Standard Compounding Protocol, the results were reported as the Standard Reinforcement Index.

Preparation of Precipitated Silica

Precipitated silica was produced by acidifying sodium silicate solution with sulfuric acid. The majority of the precipitate was formed at a pH above 8.5. Further precipitate was produced by continuing the acid addition until the solution pH reached a level from 3.3 to 4.0.

A sample of the precipitated silica for surface area analysis, as described in Example 15, was prepared by filtering and washing a portion of the silica until the rinse water demonstrated a conductivity level of from about 300 to 800 micromhos. The resulting filter cake was re-liquefied using a high shear agitator to form a solid in liquid suspension. The suspension was dried in a Niro spray drier (inlet temperature about 360° C. and the outlet temperature about 110° C.). Listed in Table 1 are the surface areas of the precipitated silica used to prepare the modified silica of the Examples and Comparative Examples.

Examples 1-6

Approximately 50 kilograms (kg) of the precipitated silica suspension of which about 3.25 kg is silica and from 15.2 to 15.9 kg of isopropyl alcohol were added to a 30 gallon glass lined vessel having a bottom drain. The vessel was also equipped with a temperature recorder, mechanical stirrer, means for heating and a condenser.

While the contents of the vessel were stirred and heating initiated, 3-mercaptopropyltrimethoxysilane (MPTMS) was added over an interval of time (typically, about 10 minutes) that would yield the approximate amounts listed for wt. % of MPTMS per silica on a dry basis for the examples listed in Table 1. After completion of the MPTMS addition, dimethyldichlorosilane (DMDCS) was added in an identical manner to yield the approximate amounts listed for wt. % of DMDCS per silica on a dry basis in Table 1. The weight ratios of MPTMS/DMDCS are also listed in Table 1. The resulting pH of the solutions ranged from about 1.5 to about 2.2.

After completion of the DMDCS addition, an amount of concentrated, i.e., about 37 wt. %, hydrochloric acid necessary to reduce the pH of the solution to about 0.3 was added. The mixture was heated to about 68° C. and held at this temperature for about 30 minutes. While cooling, enough 50 wt. % NaOH was added to the mixture over an interval of time to adjust the pH to about 3.5. After completion of the NaOH addition, enough toluene (typically 6.75 to 7.75 kg) was added to the stirred mixture to effect separation of the hydrophobic precipitated silica from the aqueous phase without forming an emulsion. The aqueous phase was drained from the vessel. The stirred mixture in the vessel containing the hydrophobic precipitated silica was then washed with about 30 kg of water. Enough additional toluene (typically 6.5 to 8.0 kg) was added to the stirred mixture to effect separation of the hydrophobic precipitated silica from the aqueous phase without forming an emulsion. The aqueous phase was drained. The stirred mixture containing the hydrophobic precipitated silica was then washed two more times with about 30 kg of water per wash. The aqueous phase was drained from the vessel after each wash and before addition of the subsequent wash.

After washing was completed, enough toluene (typically from 12.5 to 15.3 kg) was added to the stirred mixture to make a flowable solid-in-liquid suspension that could be easily discharged from the vessel. The resulting suspension was dried in a rotocone drier under vacuum (minimum 23 inches of mercury) at a minimum of 140° C. Drying was continued until the samples showed a wt. % loss of less than 4% when exposed to 160° C. for 10 minutes.

Example 7

The procedure described for Examples 1-6 was followed except for the following: 80 g of 3-mercapto-propyltrimethoxysilane (MPTMS) was added over about 10 minutes; 487 g of dimethyldichlorosilane was added over about 10 minutes; isopropyl alcohol and toluene were not used and slurries of three individual batches were combined, filtered and washed with water until the rinse water demonstrated a conductivity level of from about 300 to 800 micromhos. The treated silica sample was dried until a sample showed <2 wt. % loss when exposed to 160° C. for 10 minutes.

The approximate wt. % s of MPTMS and DMDCS per silica on a dry basis and the weight ratio of MPTMS/DMDCS for the modified silica sample of Example 7 are listed in Table 2.

Example 8

The procedure described for Examples 1-6 was used with the following exceptions: 40 kg of a re-liquefied solid in liquid precipitated silica suspension (3.3 kg of silica) and 12.2 kg of isopropyl alcohol were used; 171 g of 3-mercaptopropyltrimethoxysilane (MPTMS) was added over about 7 minutes; 506 g of dimethyldichlorosilane (DMDCS) was added over about 2 minutes; concentrated hydrochloric acid was added over 24 minutes resulting in a solution pH of about 0.4; after heating the solution for 30 minutes at about 68° C., enough 50 wt. % NaOH was added to adjust the pH to about 7.0; enough toluene (about 7.1 kg) was added to effect separation of the hydrophobic silica from the aqueous phase without forming an emulsion. The recovered product was not subjected to water washing but, after draining the aqueous phase, about 2.2 kg of toluene was added to the product to make a flowable solid in liquid suspension. The treated silica sample was dried until a sample showed <1.5 wt. % loss when exposed to 160° C. for 10 minutes.

The approximate wt. % s of MPTMS and DMDCS per silica on a dry basis and the weight ratio of MPTMS/DMDCS for the modified silica sample of Example 8 are listed in Table 2.

Example 9

The procedure of Example 8 was followed except that 86.5 g of 3-mercaptopropyltrimethoxysilane (MPTMS) was used.

The approximate wt. % s of MPTMS and DMDCS per silica on a dry basis and the weight ratio of MPTMS/DMDCS for the modified silica sample of Example 9 are listed in Table 2.

Examples 10-13

Both silane (DMDCS & MPTMS) and acid (sufficient to result in a pH of about 0.3) were co-mixed with a freshly prepared silica slurry having a temperature of about from 65 to 85° C. immediately prior to being added to a vessel. The acid used was concentrated, i.e., about 96 wt. %, sulfuric acid in all of the examples except Example 13 which used concentrated hydrochloric acid. The resulting mixture was left quiescent for at least 15 minutes. Water was added, agitation applied and the pH was adjusted to 3.5 with 50 wt. % aqueous NaOH. The resulting aqueous suspension of hydrophobic silica was filtered and washed with water until the rinse water demonstrated a conductivity level of from about 300 to 800 micromhos. The hydrophobic silica was dried until a sample showed less than 2.5 wt. % loss when exposed to 106° C. for 10 minutes. The approximate amounts of the silanes added to the slurry are reported in Table 2 on a percentage weight based on dry silica along with the weight ratios of MPTMS/DMDCS.

Example 14

The procedure of Examples 10-13 was followed with the exception that no acid was added, only the acid generated by the hydrolysis of DMDCS was present. Enough (MPTMS) and enough dimethyldichlorosilane (DMDCS) were added to result in the approximate wt. % s of each per silica on a dry basis listed in Table 2. The pH of the resulting solution was 1.6.

Comparative Examples 1-3

The procedure described for Examples 1-6 was followed. The approximate amounts of the silane added to the slurry are reported in Table 2 on a percentage weight based on dry silica along with the weight ratios of MPTMS/DMDCS.

Comparative Example 4

The procedure of Examples 10-13 was followed except that only mercaptopropyltrimethoxysilane was added to result in the approximate wt. % of MPTMS per silica on a dry basis listed in Table 2, and enough concentrated sulfuric acid was added to result in a pH of about 0.0.

Comparative Example 5

The procedure of Comparative Example 4 was followed except that only dimethyldichlorosilane was added to result in the approximate wt. % of DMDCS per silica on a dry basis listed in Table 2, enough concentrated sulfuric acid was added to result in a pH of about 0.4.

Example 15

The surface area of the treated and untreated test silica samples of Examples 1-14 and Comparative Examples (CE) 1-5 was determined using a Horiba 6200 series instrument by a dynamic single point surface area technique, ASTM D3037-93, Procedure C (modified). This procedure simulates the Brunauer-Emmett-Teller (BET) method at $P/P_o$=0.294 using 30% nitrogen-in-helium as the adsorbate gas. The ASTM procedure was modified as follows: a 30% nitrogen-in-helium gas mixture was used; a flow of approximately 40 mL/min. was maintained; samples were dried in the analysis cells under a flow of nitrogen at 180±5° C. for one hour; and the adsorbed nitrogen on the sample was desorbed by removing the dewar of liquid nitrogen and allowing the sample to warm to room temperature with no external heat source. Results for the untreated test silica samples are listed in Table 1 and results for the treated test silica samples are listed in Table 3.

The percent carbon was determined by CHN analysis using a Carlo Erba model 1106 elemental analyzer. A 1-2 mg sample in a sealed tin capsule was burned in an oxygen enriched atmosphere at 1040° C. with a Helium carrier, quantitatively combusted over $Cr_2O_3$, then the combustion gases were passed over Cu at 650° C., to eliminate the excess oxygen and reduce the oxides of nitrogen to nitrogen. The gases were then passed through a chromatographic column, separated and eluted as $N_2$, $CO_2$, and $H_2O$. The eluted gases were measured by a thermal conductivity detector. The instrument was calibrated by combustion of standard compounds. Results are listed in Table 3.

The percent mercapto (SH) listed in Table 3 was determined by accurately weighing 2-3 grams of the treated silica to the nearest 0.001 g in an Erlenmeyer flask, adding 75 ml of isopropyl alcohol, flushing with nitrogen, sealing with a wet stopper and magnetically stirring for 30 minutes. The stirred solution was titrated quickly with standard 0.01N Iodine solution, commercially available from LabChem Inc., to a slight yellow endpoint. A blank titration was also done by following the same procedure except without adding the treated silica. If blocked mercaptosilane was used to modify the filler, it will be necessary to deblock the blocked mercaptosilane before titrating. The following equation was used to obtain the final value:

$$\% SH = (V1 - V2) \times N \times 3.3 / W$$

wherein:
V1 is the volume of iodine solution used with the sample,
V2 is the volume of iodine solution used in the blank,
N is the normality of the iodine solution, and
W is the weight of the silica in grams.

The Silane Conversion Index reported as SCI in Table 3 was determined by solid state $^{29}$Si NMR. This data was collected at ambient temperature on a Bruker AM-300 NMR with a narrow bore magnet and a Doty 7 mm standard speed MAS probe. Samples were packed into 7 mm o.d. zirconia rotors and sealed with short Kel-F caps. The rotors were spun at the Magic Angle with a speed of about 5.0 kHz. Cross Polarization (CP/MAS) data was collected using a 90° $^1$H pulse, 5600-8400 scans per spectrum, a 5 msecond contact time, high power proton decoupling during data acquisition, and a 3 second relaxation delay. Hartmann-Hahn conditions were achieved using a kaolinite sample (J. Rocha and J. Klinowski, *J. Magn. Reson.*, 90, 567 (1990)). All chemical shifts were referenced externally to tetramethylsilane (TMS).

All spectra were analyzed using a nonlinear curve fitting program (LINESIM) on an Aspect 3000 computer to determine the relative area % for the $T^1$ (−49 ppm), $T^2$ (−57 ppm), and $T^3$ (−65 ppm) peaks. Area % values for $T^1$, $T^2$, and $T^3$ were determined by curve fitting over the region of −30 ppm to −80 ppm.

pH determinations were made on the treated filler of the Examples and Comparative Examples by the following procedure: add 5.0 g of silica (in powder form) to a 150 mL beaker containing a magnetic stir bar; add 50 mL of isopropanol and 50 mL of deionized water; and stir vigorously without splashing until the silica is suspended. Place a calibrated pH electrode in the vigorously stirring solution and record the pH reading after one minute (±5 sec). The results are listed in Table 3.

The Standard Reinforcement Index reported in Table 3 was determined by dividing the Tensile Stress at 300% elongation by the Tensile Stress at 100% elongation. The values for the Tensile Stress at 300% and 100% elongations are included in Table 4.

The Soxhlet Extractable percent carbon of the treated silica of Examples 1, 2 and 7 was determined by adding approximately 5 grams of each material to 43 mm×123 mm (internal diameter×external length) cellulose extraction thimbles which was placed into an approximately sized Soxhlet extraction tube which was fitted with a condenser. This Soxhlet extractor and condenser system was attached to a round bottom flask containing 700 mL of toluene. The flask was heated to the reflux temperature of the toluene. After refluxing for a minimum of 19 hours (typically 19 to 26 hours), the used toluene was replaced with unused toluene and refluxing was continued for a minimum of 19 hours (typically 19 to 24 hours). The resulting extracted treated silica was recovered and dried until a sample showed less than a 1.2 wt. % loss when exposed to 160° C. for 10 minutes. The percent carbon of each extracted sample was determined using the procedure described herein. The Soxhlet extractable percent carbon was determined using the following equation:

$$\frac{(\% \text{ carbon before extraction}) - (\% \text{ carbon after extraction})}{(\% \text{ carbon before extraction})} \times 100$$

The results are listed in Table 5.

TABLE 1

| Untreated Silica Used in Examples | Surface Area $m^2/g$ |
|---|---|
| 1-7 & CE1-3 | 191 |
| 8 & 9 | 193 |
| 10 | 172 |
| 11 | 187 |
| 12 | 182 |
| 13 | 214 |
| 14 | 188 |
| CE4 & 5 | 199 |

TABLE 2

| Example # | % MPTMS/SiO$_2$ | % DMDCS/SiO$_2$ | Ratio MPTMS/DMDCS |
|---|---|---|---|
| 1 | 2.5 | 15.0 | 0.17:1 |
| 2 | 2.5 | 27.1 | 0.09:1 |
| 3 | 1.0 | 22.0 | 0.05:1 |
| 4 | 5.0 | 15.0 | 0.33:1 |
| 5 | 2.5 | 15.0 | 0.17:1 |
| 6 | 4.0 | 22.2 | 0.18:1 |
| 7 | 2.5 | 15.0 | 0.17:1 |
| 8 | 5.2 | 15.3 | 0.34:1 |
| 9 | 2.6 | 15.3 | 0.17:1 |
| 10 | 4.0 | 22.2 | 0.18:1 |
| 11 | 4.0 | 10.0 | 0.40:1 |
| 12 | 6.0 | 15.0 | 0.40:1 |
| 13 | 4.0 | 22.2 | 0.18:1 |
| 14 | 4.0 | 20.0 | 0.20:1 |
| CE1 | 0.0 | 15.0 | 0:15 |
| CE2 | 1.0 | 12.0 | 0.08:1 |
| CE3 | 0.5 | 15.0 | 0.03:1 |
| CE4 | 4.0 | 0.0 | 4:0 |
| CE5 | 0.0 | 22.0 | 0:22 |
| Ciptane ®1[12] | 3.0 | 0.0 | 3:0 |

[12] A synthetic precipitated silica, which is reported to be precoated with 3 wt. % of gamma-mercaptopropyltrimethoxysilane and which is available from PPG Industries, Inc.

TABLE 3

| Example # | Surface Area ($m^2/g$) | Carbon (wt. %) | SH (wt. %) | SCI** | SRI*** | pH |
|---|---|---|---|---|---|---|
| 1 | 132 | 2.2 | 0.32 | 0.55 | 4.8 | 6.0 |
| 2 | 112 | 3.1 | 0.30 | 0.56 | 4.5 | 6.7 |
| 3 | 119 | 2.5 | 0.16 | 0.62 | 4.2 | 6.8 |
| 4 | 128 | 2.3 | ND* | 0.56 | 4.9 | 7.3 |
| 5 | 128 | 2.0 | 0.30 | 0.51 | 4.6 | 6.5 |
| 6 | 113 | 3.0 | 0.65 | ND* | 5.3 | 6.6 |
| 7 | 126 | 2.2 | 0.43 | 0.52 | 4.3 | 7.1 |
| 8 | 103 | 2.8 | 0.63 | ND* | 5.1 | 8.8 |
| 9 | 108 | 2.7 | ND* | ND* | 5.1 | 10.1 |
| 10 | 118 | 3.3 | 0.38 | ND* | 4.6 | 6.9 |
| 11 | 146 | 2.0 | 0.53 | ND* | 4.3 | 6.3 |
| 12 | 123 | 3.0 | 0.58 | ND* | 4.3 | 6.7 |
| 13 | 115 | 3.9 | 0.41 | ND* | 4.0 | 6.8 |
| 14 | 139 | 1.5 | 0.24 | 0.45 | 4.1 | 6.6 |
| CE 1 | 137 | 1.5 | <0.001 | ND* | 2.7 | 6.5 |
| CE 2 | 149 | 1.4 | 0.12 | ND* | 3.6 | 6.1 |
| CE 3 | 139 | 1.6 | 0.1 | ND* | 3.5 | 5.8 |
| CE 4 | 194 | 0.6 | 0.34 | ND* | 2.9 | 6.7 |
| CE 5 | 134 | 2.6 | <0.001 | ND* | 2.6 | 6.6 |
| Ciptane ® 1 | 132 | 0.5 | 0.4 | 0.27 | 3.2 | 7.0 |

ND* indicates that the test was not done.
SCI** represents the Silane Conversion Index.
SRI*** represents the Standard Reinforcement Index.

TABLE 4

| Example # | Tensile Stress at 300% Modulus | Tensile Stress at 100% Modulus |
|---|---|---|
| 1 | 8.9 | 1.8 |
| 2 | 8.2 | 1.8 |
| 3 | 7.0 | 1.7 |
| 4 | 10.8 | 2.2 |
| 5 | 8.7 | 1.9 |
| 6 | 12.0 | 2.3 |
| 7 | 7.8 | 1.8 |
| 8 | 11.1 | 2.2 |
| 9 | 9.9 | 1.9 |
| 10 | 9.3 | 2.0 |
| 11 | 8.0 | 1.9 |
| 12 | 10.2 | 2.4 |
| 13 | 6.2 | 1.6 |
| 14 | 7.4 | 1.8 |
| CE1 | 2.8 | 1.0 |
| CE2 | 6.1 | 1.7 |
| CE3 | 5.5 | 1.6 |
| CE4 | 5.5 | 1.9 |
| CE5 | 3.8 | 1.5 |
| Ciptane ®1 | 4.8 | 1.5 |

TABLE 5

| Example # | % Carbon Before | % Carbon After | % Carbon Extracted |
|---|---|---|---|
| 1 | 2.18 | 1.81 | 16.97 |
| 2 | 3.11 | 2.54 | 18.33 |
| 7 | 2.20 | 2.16 | 1.82 |

The results of Table 1 show that the surface areas of the untreated silica samples used in the process of making the Examples and Comparative Examples ranged from 172 to 214 m²/g.

The MPTMS/DMDCS ratios listed in Table 2 for Examples 1-14 ranged from 0.05:1 to 0.40:1. The ratios for Comparative Examples 2 and 3, which contained both silanes, were 0.08:1 and 0.03:1, respectively. Although the MPTMS/DMDCS ratio of Comparative Example (CE) 2 was within the desired range of 0.05:1 to 10:1, the results for mercapto (SH) wt. %, listed in Table 3 for the treated silica of CE-2 were less than the required amount of greater than 0.15 wt. %.

The results of Table 3 show that the modified silica samples of the present invention, i.e., Examples 1-14, demonstrated a Standard Reinforcement Index of at least 4.0, a carbon wt. % of greater than 1.0, a mercapto wt. % greater than 0.15 and a Silane Conversion Index, i.e., $T^3/(T^1+T^2+T^3)$, of at least 0.3. The Comparative Examples had a carbon wt. % and/or a mercapto wt. % below that of the Examples 1-14 and had a Standard Reinforcement Index of less than 4.0, e.g., 3.6.

The results of Table 4 showed that all of the modified silicas of the present invention, i.e., Examples 1-14, demonstrated a Tensile Stress at 300% elongation of 6.2 or greater. The Tensile Stress at 300% elongation for the Comparative Examples was 6.1 or less.

The results of Table 5 show that the Soxhlet extractable percent carbon ranged from a low of 1.82% for Example 7, to a high of 18.33% for Example 2.

Example 16

Rubber Alcohol Emissions

The effect of the chemically treated filler of the present invention on alcohol emissions was tested by comparing the alcohol emissions before and after curing rubber compositions containing a chemically treated filler of the present invention (Filler A, compound #16.1) and conventional untreated precipitated silica (Filler B, compound #16.2) and conventional untreated precipitated silica (Filler B) in combination with the alkoxy silane 3,3'-bis(triethoxysilylpropyl) tetrasulfide (compound #16.3).

The properties of the fillers are listed in Table 6. The surface area, carbon and pH were tested using the respective procedures recited in Example 15. The amount of SH was determined using the following procedure. Using an analytical balance, 2 g.+ or −0.5 g. of sample was weighed and recorded (to the nearest 0.1 mg) into a tared 150 mL Erlenmeyer flask. With a stir bar, 75 mL of IPA (using a graduated cylinder), and 10 mL of 0.1N iodine (using a 10 mL pipet) were added. The flask flushed with a moderate flow of nitrogen for about 30 seconds and immediately corked with a rubber stopper. A small amount of IPA was applied to the tapered portion of the stopper to help create a hermetic seal. The flask was placed on a stir plate and allowed to moderately stir for 15 minutes. After the 15-minute stirring time had elapsed, the rubber stopper was removed and immediately titrated with standardized 0.1N+ or −0.0005N sodium thiosulfate to a colorless end point (that remains colorless for 1 minute) using a class "A" 10 mL buret. The final volume of the titration of 0.1N sodium thiosulfate was recorded. A blank titration value was determined for the calculation by following precisely the above procedure and omitting only the sample.

The amount of SH in weight % was calculated using the following equation:

((mL of sodium thiosulfate for blank−mL of sodium thiosulfate for sample)×(N of sodium thiosulfate)×(3.3))/sample weight in grams.

TABLE 6

| Filler | Surface Area (m²/g) | Carbon (wt. %) | SH (wt. %) | pH |
|---|---|---|---|---|
| A | 136 | 3.1 | 0.49 | 6.6 |
| B | 169 | <0.02 | <0.02 | 7.2 |

The rubber compositions were prepared using the enumerated ingredients shown in Table 7 and the procedure described hereinafter. Information on the enumerated ingredients can be found in the Standard Compounding Protocol. Note, 3,3'-bis(triethoxysilylpropyl)tetrasulfide was commercially obtained from Degussa Corporation under the trade name Si-69.

TABLE 7

| | | Compound # | | |
|---|---|---|---|---|
| Min | BANBURY 1st Pass | 16.1 Phr | 16.2 phr | 16.3 phr |
| 0 | Solflex 1216 (sSBR) | 70.0 | 70.0 | 70.0 |
| " | BR1207 (BR) | 30.0 | 30.0 | 30.0 |
| 0.5 | Filler A | 57.50 | | |
| " | Filler B | | 53.39 | 53.39 |
| " | Si-69 | | | 6.5 |
| 3.0 | Kadox Zinc Oxide (Part A) | 2.5 | 2.5 | 2.5 |
| " | Filler A (Part A) | 12.50 | | |
| " | Filler B (Part A) | | 11.61 | 11.61 |
| " | Sundex 8125 (Part A) | 30.0 | 30.0 | 30.0 |
| " | Wingstay 100 (Part A) | 2.0 | 2.0 | 2.0 |
| " | Stearic Acid (Part A) | 1.0 | 1.0 | 1.0 |
| | TOTAL PARTS: | 200.5 | 207.0 | 205.5 |
| | DUMP TIME, MIN | 5.0 | 5.0 | 5.0 |
| | DUMP TEMP, ° C. | 150 | 150 | 150 |

Sheet stock off at 0.085" thickness
Allow stock to cool to 23 C. before next pass.
After minimum of 1 hour rest

| Min | BANBURY 2nd Pass | Phr | phr | phr |
|---|---|---|---|---|
| 0 | MASTERBATCH | 200.5 | 207.0 | 205.5 |
| " | Santoflex 13 | 2.0 | 2.0 | 2.0 |
| " | Okerin 7240 | 1.5 | 1.5 | 1.5 |
| 0.5 | RM Sulfur | 2.0 | 2.0 | 2.0 |
| " | TBBS | 3.0 | 3.0 | 3.0 |
| " | DPG | 0.5 | 0.5 | 0.5 |
| | SUBTOTAL: | 9.0 | 9.0 | 9.0 |
| | TOTAL PARTS: | 209.5 | 216.0 | 214.5 |
| | DUMP TIME, MIN | 4.0 | 4.0 | 4.0 |
| | DUMP TEMP, ° C. | 125 | 125 | 125 |

Part A

The following ingredients in amounts of parts per hundred parts of rubber by weight (phr) were added in the order described to a polyethylene bag held erect in a 500-milliliter (mL) plastic cup:

| Material | Amount (phr) |
| --- | --- |
| Sundex 8125 | 30.0 |
| Kadox Zinc oxide | 2.5 |
| Wingstay 100 | 2.0 |
| Stearic acid | 1.0 |
| Filler A | 12.50 |
| or Filler B | 11.61 |

A 1.89 liter (L) Farrel B Banbury mixer (Model "BR") was used for mixing the various ingredients. Immediately prior to adding the batch ingredients to the mixer, 800 grams (g) of CV-60 grade natural rubber was put through the mixer to clean it of any residue of previous runs and increase the temperature to about 93° C. (200° F.). After removing the rubber, the mixer was cooled to about 65° C. (150° F.) before adding the ingredients to produce the rubber test samples.

The first pass was initiated by adding the rubber, viz., sSBR and BR, to the mixer and mixing for 0.5 minute at 116 rpm. The rotor speed was maintained at 116 rpm and the appropriate amount of the specified filler indicated in Table 7 was added. After a further 1.5 minute, the ram was raised and the chute swept, i.e., the covering on the entry chute was raised and any material that was found in the chute was swept back into the mixer. After another minute, the sample from Part A was added. After another minute, the ram was raised and the chute swept. The contents in the mixer were mixed for the additional time (DUMP TIME) to the maximum temperature (DUMP TEMP) indicated in Table 7 to complete the first pass in the mixer. The rotor speed of the mixer was increased or decreased to achieve the maximum temperature (DUMP TEMP) within the specified mixing period (DUMP TIME).

After completing the first pass, the temperature of the material was determined with a thermocouple to verify that it did not exceed the maximum temperature (DUMP TEMP) indicated. The removed material was weighed and sheeted in a Farrel 12 inch two-roll rubber mill at 2.032 mm±0.127 mm (0.080 inch±0.005 inch). The resulting milled stock was cut into strips in preparation for the second pass in the mixer.

A minimum of one hour was allotted between the completion of the first pass in the mixer and the beginning of the second pass to allow the milled stock to cool. If needed, the aforedescribed cleaning and warming-up procedure using CV-60 grade natural rubber was completed prior to initiating the second pass. The temperature of the mixer was adjusted to approximately 49° C. (120° F.). With the cooling water running, the second pass was initiated by adding the strips of first pass stock to the mixer operating at 77 rpm and the pre-weighed combination of Santoflex® 13 antiozonant and Okerin® 7240 microcrystalline wax/paraffin wax blend. After 0.5 minutes, the second addition of the combination of RM Sulfur, TBBS and DPG was added. After a further 1.5 minutes, the ram was raised and the chute swept. The second pass was completed by mixing the stock an additional 2.0 minutes while maintaining the temperature at or below 125° C. (257° F.).

A Farrel 12 inch two-roll rubber mill was heated to approximately 60° C. (140° F.). The stock from the second pass of Part B was fed into the running mill with a nip setting of 2.032 mm±0.127 mm (0.080 inch±0.005 inch). The resulting sheet was placed on a flat surface until the temperature of the sheet reached room temperature. Typically, the sheet cooled within about 30 minutes. Afterwards, the milled sheet was fed into the rubber mill with a nip setting of 3.81 mm±0.51 mm (0.15 inch±0.02 inch). The rolling bank was adjusted, if necessary, to maintain a uniform thickness. The resulting material was subjected to 16 side cuts and then 8 end passes. The rubber mill nip was adjusted to produce a sheet thickness of 2.032 mm±0.127 mm (0.080 inch±0.005 inch). The sheet stock collected off the mill was placed on a flat clean surface. Using a stencil, a rectangular sample 203.2 mm×152.4 mm (8 inches×6 inches) was cut from the sheet stock. The sample (compound A) was conditioned, i.e., stored between clean polyethylene sheets and maintained for 15 to 18 hours at a temperature of 23°±2° C., and a relative humidity of 50%±5%. Some of this compound was used for alcohol emissions testing as described below.

After conditioning, the sample was placed in a 203.2 mm×152.4 mm×2.286 mm (8 inch×6 inch×0.09 inch) standard frame machine steel compression mold having a polished surface. The sample was cured in a 61 centimeter×61 centimeter (24 inch×24 inch) 890 kilo newton (100 ton) 4-post electrically heated compression press, for T90, i.e., the time it takes for 90 percent of the cure to occur, in accordance with ASTM D-2084, plus 5 minutes at 150° C. (302° F.) under a pressure of 13.79 megapascals (2000 pounds per square inch). Typically, curing was completed within about 10 minutes. The resulting cured rubber sheet was removed from the mold and maintained for 15 to 18 hours at a temperature of 230±2° C. (73.4±3.6° F.), and a relative humidity of 50%±5% prior to testing. These sheets (compound B) were used to produce the test specimens for alcohol emissions, modulus @ 300% and Ratio 300%/100% Modulus determinations.

Alcohol emissions (methanol and ethanol) were determined by analyzing the samples using headspace-GC in accordance with the conditions hereinafter described in Example 23. The before cure (BC) samples (i.e. compound A) were heated @ 150° C. for 20 minutes before analysis. The after cure (AC) samples (i.e. compound B) were heated @ 100° C. for 60 minutes before analysis. The sample size was approximately 35 mg. Each compound was analyzed in triplicate with samples being taken diagonally across the sample. To account for differences in sample weights between runs the peak area was divided by the sample weight. The relative concentrations are based on compound 16.3 BC since this had the largest amount present.

The Modulus @ 300% and Ratio 300%/100% Modulus was determined in accordance with ASTM D 412-98a—Test Method A. The dumbbell test specimens were prepared using Die C. An Instron model 4204 with an automated contact extensiometer for measuring elongation was used. The crosshead speed was found to equal 508 mm/min. All calculations were done using the Series IX Automated Materials Testing software supplied by the manufacturer. The Ratio 300%/100% Modulus equals the Tensile Stress at 300% elongation (in MPa) divided by the Tensile Stress at 100% elongation (in MPa).

The results are summarized in Table 8. These results show that the inventive compound (16.1) has essentially no alcohol emissions, equivalent to a compound in which only silica is added (16.2), while maintaining the same cured properties as the current in-situ silane technology (16.3).

TABLE 8

| | Compound# | | |
|---|---|---|---|
| | 16.1 | 16.2 | 16.3 |
| Filler A | 70.0 | | |
| Filler B | | 65.0 | 65.0 |
| Si-69 | | | 6.5 |
| Before cure (BC) samples (i.e. compound A) | | | |
| Ethanol Response | 631,350 | 462,173 | 146,185,246 |
| Methanol Response | 0 | 0 | 0 |
| Total Alcohol (Rel. Conc, %) | 0.43 | 0.32 | 100.00 |
| After cure (AC) samples (i.e. compound B) | | | |
| Ethanol Response | 87,873 | 85,015 | 83,255,300 |
| Methanol Response | 0 | 0 | 0 |
| Total Alcohol (Rel. Conc.) | 0.06 | 0.06 | 56.95 |
| Modulus @ 300%, MPa | 12.1 | 4.5 | 13.2 |
| Ratio 300%/100% Modulus | 4.2 | 2.9 | 4.2 |

Example 17

Pre-Cure

This example demonstrates that a compound produced by the invention essentially does not pre-cure. The formulations are shown in Table 10. Both formulations were mixed in a brabender mixer equipped with Banbury blades following the procedure described below. Individual samples from the respective compounds were evaluated using an MDR rheometer (described below) using the test temperatures indicated (i.e. 120° C. to 190° C. at 10° C. increments). The results are shown graphically in FIGS. 1 and 2 respectively. As shown, the compound produced by the inventive process (compound 17.1, FIG. 1) will not pre-cure (i.e. does not show any significant build-up of torque with time at any temperature up to at least 190° C.). In comparison, compounds produced using known technology will pre-cure at temperatures as low as 130 to 140° C. (compound 17.2, FIG. 2).

Filler Characterization

The properties of the fillers are listed in Table 9. The surface area, carbon and pH were tested using the respective procedures identified in Example 15. The amount of SH was determined using the procedure described in Example 16.

TABLE 9

| Filler | Surface Area (m²/g) | Carbon (wt. %) | SH (wt. %) | pH |
|---|---|---|---|---|
| C | 145 | 2.8 | 0.49 | 6.2 |
| D | 185 | <0.02 | <0.02 | 6.5 |

Compounding

Information on the enumerated compounding ingredients can be found in the Standard Compounding Protocol. The compounding ingredient X 50-S® is a 1:1 blend of the bifunctional, sulfur-containing organosilane Si 69® (Bis-(triethoxysilylethoxy tetrasulfide)) and an N 330 type carbon black, obtained commercially from Degussa.

The rubber compositions were prepared using the enumerated ingredients shown in Table 10 and the procedure described hereinafter.

A C.W. Brabender Mixer Type EPL2-5501 equipped with Banbury blades and with an oil heated 350-420 ml mixing chamber was used for mixing the various ingredients. The mixer was allowed to warm for approximately 30 minutes to between 70 and 80° C.

The first pass was initiated by adding the rubber, viz., sSBR and BR, to the mixer and mixing for 0.5 minute at 85 rpm. The rotor speed was maintained at 85 rpm and the appropriate amount of the specified filler was added. After another minute, the ram was raised and an additional amount of the specified filler and, for compound 17.2, 13.0 phr of X-50S was added. After a further 1.5 or 2.0 minutes, the sample from Part A.1 or A.2 was added. The contents in the mixer were mixed for an additional 2.5 or 3.0 minutes to the maximum temperature indicated. During this additional mixing time the ram was periodically raised and swept to ensure that all material was incorporated into the mix. The rotor speed of the mixer was increased or decreased to achieve the maximum temperature within the specified mixing period.

After completing this first pass, the temperature of the material was determined with a thermocouple to verify that it did not exceed the maximum temperature indicated. The removed material was weighed and sheeted in a Farrel 12 inch two-roll rubber mill at 2.032 mm±0.127 mm (0.080 inch±0.005 inch). The resulting milled stock was allowed to cool to room temperature.

TABLE 10

| | | | | Compound | |
|---|---|---|---|---|---|
| Min | Temp | RPM | BRABENDER 1 | 17.1 phr | 17.2 Phr |
| | 70-80° C. | 85 | PREWARM MIXER | | |
| 0.0 | | | Solflex 1216 (sSBR) | 70.0 | 70.0 |
| " | | | Budene 1207 (BR) | 30.0 | 30.0 |
| | | | WEIGHT RAM | | |
| 0.5 | | | Filler C | 30.0 | |
| " | | | Filler D | | 26.25 |
| | | | WEIGHT RAM | | |
| 1.5 | | | Filler C | 30.0 | |
| " | | | Filler D | | 26.25 |
| " | | | X 50-S | | 13.0 |
| | | | WEIGHT RAM | | |
| 3.0 | | | Other Additives | A.1 | |
| 3.5 | | | Other Additives | | A.2 |
| | | | Dump Time, minutes | 5.0 | 6.0 |
| | | | Dump Temperature, ° C. | 150 | 160 |
| | | | TOTAL: | 205.5 | 213.5 |

A.1

The following ingredients in amounts of parts per hundred parts of rubber by weight (phr) were added in the order described to a polyethylene bag held erect in a 500-milliliter (mL) plastic cup:

| Material | Amount (phr) |
|---|---|
| Sundex 8125 | 30.0 |
| Kadox ® Zinc oxide | 2.5 |
| Wingstay ® 100 | 2.0 |
| Stearic acid | 1.0 |
| Filler C | 10.0 |

A.2

The following ingredients in amounts of parts per hundred parts of rubber by weight (phr) were added in the order described to a polyethylene bag held erect in a 500-milliliter (mL) plastic cup:

| Material | Amount (phr) |
|---|---|
| Sundex 8125 | 30.0 |
| Kadox ® Zinc oxide | 2.5 |
| Wingstay ® 100 | 2.0 |
| Stearic acid | 1.0 |
| Filler D | 12.5 |

Part C—Testing

The cure profile was determined using a MDR 2000 (Moving Die Rheometer) following the Standard Test Method for Rubber Property—Vulcanization Using Rotorless Cure Meters, ASTM Designation: D 5289-95. Individual samples were tested at temperatures from 120° C. to 190° C. at 10° C. increments. The cure profile for the inventive compound (17.1) is shown graphically in FIG. 1 and the cure profile for the comparative compound (17.2) is shown in FIG. 2.

Example 18

Dump Time/Temperature

The effect of dump time and dump temperature of a rubber composition incorporating the chemically treated filler of the present invention was tested using filler A from Example 16 (Table 6). The filler was compounded using the same ingredients and procedure as described in Example 16 (Table 7, compound 16.1) except that in the first pass, the dump time and temperatures used are those shown in Table 11. The rotor speed was increased or decreased to achieve the Dump Temperature within the specified Dump Time.

TABLE 11

| Compound | Dump Time (min) | Dump Time (° C.) |
|---|---|---|
| 1 | 4.0 | 150 |
| 2 | 5.0 | 170 |
| 3 | 5.0 | 150 |
| 4 | 7.0 | 150 |
| 5 | 5.0 | 130 |
| 6 | 5.0 | 150 |
| 7 | 7.0 | 170 |
| 8 | 10.0 | 177 |

Part C of the Standard Compounding Protocol was performed on Compounds 1-8. The sheets were used to produce the test specimens for the Modulus @ 200%, Modulus @ 300%, Ratio 200%/100% Modulus, and Ratio 300%/100% Modulus determinations.

Rebound buttons were produced by taking the material subjected to the 16 side cuts and then 8 end passes and sheeting off at 3.81 mm±0.13 mm (0.150 inch+/−0.005 inch). The resulting sheet was removed from the mill and folded in half making a sheet stock thickness of 7.62 mm±0.13 mm (0.300 inch+/−0.005 inch). Using a one inch punch, three samples were punched out of this sheet stock. The samples were than stacked on top of one another. The total weight of the sample was 12 grams +/−1 gram. The samples were cured in a 1⅛ inch round by ½ inch thick cavity with a flat plate on the top and bottom. The samples were cured in a 61 centimeter×61 centimeter (24 inch×24 inch) 890 kilonewton (100 ton) 4-post electrically heated compression press, for T90, i.e., the time it takes for 90 percent of the cure to occur, in accordance with ASTM D-2084, plus 10 minutes at 150° C. (302° F.) under a pressure of 13.70 megapascals (2000 pounds per square inch). Typically, curing was completed within about 15 minutes. The resulting cured rubber sheet was removed from the mold and maintained for 15 to 18 hours at a temperature of 230±2° C. (73.4±3.6° F.), and a relative humidity of 50%±5% prior to testing in Part D.

The Mooney Scorch (T5) was determined using a Mooney Viscometer Model MV 2000 equipped with a small rotor following the Standard Test Method for Rubber-Pre-Vulcanization Characteristics, ASTM Designation: D 1646-98a.

The Mooney Viscosity ML 4100° C. was determined using a Mooney Viscometer Model MV 2000 equipped with a large rotor following the Standard Test Method for Rubber-Pre-Vulcanization Characteristics, ASTM Designation: D 1646-98a.

The Scorch Time (TS2) was determined using a MDR 2000 (Moving Die Rheometer) following the Standard Test Method for Rubber Property-Vulcanization Using Rotorless Cure Meters, ASTM Designation: D 5289-95.

The Modulus @ 200%, Modulus @ 300%, Ratio 200%/100% Modulus, and Ratio 300%/100% Modulus was determined in accordance with ASTM D 412-98a—Test Method A. The dumbbell test specimens were prepared using Die C. An Instron Model 4204 with an automated contact extensiometer for measuring elongation was used. The cross-head speed was found to equal 508 mm/min. All calculations were done using the Series IX Automated Materials Testing software supplied by the manufacturer. The Ratio 200%/100% Modulus equals the Tensile Stress at 200% elongation (in MPa) divided by the Tensile Stress at 100% elongation (in MPa). The Ratio 300%/100% Modulus equals the Tensile Stress at 300% elongation (in MPa) divided by the Tensile Stress at 100% elongation (in MPa).

The elastic or storage modulus at 1% strain (G', 1% Strain) was determined using a Rheometrics Dynamic Analyzer 2 following ISO Method 2856 Elastomers—General Requirements for Dynamic Testing. The cylindrical specimen, 11 mm in diameter and weighing 0.86±0.01 g, is compression molded and cured between two 25 mm appropriately primed parallel sample plates at 150° C. for T90+10 minutes. The elastic or storage modulus (G') is measured at strains ranging from 0.1% to 20% at 1 HZ and 30° C. The elastic or storage modulus at 1% strain (G', 1% Strain) is calculated from a polynomial equation which was fit to the data ($r^2>0.99$).

The Rebound @ 23° C. and Rebound @ 100° C. were determined using a Zwick 5109 Rebound Resilience Tester following the Standard Test Method for Rubber Property—Resilience Using a Rebound Pendulum, ASTM Designation: D 1054-91.

The Tangent delta @ 60° C. and Tangent delta at 0° C. were determined using a Rheometrics Dynamic Analyzer 2 following ISO Method 2856 Elastomers—General Requirements for Dynamic Testing. The cylindrical specimen, 11 mm in diameter and weighing 0.86±0.01 g, is compression molded and cured between two 25 mm appropriately primed parallel sample plates at 150° C. for T90+10 minutes. The Tangent delta is measured at temperatures ranging from −45° C. to 75° C. at 1 HZ and 2% strain. The Tangent delta @ 60° C. and Tangent delta at 0° C. is calculated from a polynomial equation which was fit to the data ($r^2>0.99$).

TABLE 12

Effect of Dump Time

| | Compound No. | | | |
|---|---|---|---|---|
| | 1 | 3 | 6 | 4 |
| Dump Time (minute) | 4 | 5 | 5 | 7 |
| Dump Temperature (° C.) | 150 | 150 | 150 | 150 |
| Mooney Scorch (T5), minutes | 16 | 20 | 19 | 22 |
| Scorch Time (TS2), minutes | 4.6 | 5.3 | 5.1 | 6.1 |
| Ratio 300%/100% Modulus | 3.80 | 4.00 | 4.00 | 4.40 |
| G', 1% Strain, MPa | 2.41 | 2.15 | 2.28 | 2.04 |
| Rebound @ 100° C. | 75 | 75 | 76 | 77 |
| Tangent delta, 60° C. | 0.055 | 0.051 | 0.049 | 0.043 |

TABLE 13

Effect of Dump Temperature

| | Compound No. | | | |
|---|---|---|---|---|
| | 9 | 3 | 6 | 2 |
| Dump Time (minute) | 5 | 5 | 5 | 5 |
| Dump Temperature (° C.) | 130 | 150 | 150 | 170 |
| Mooney Scorch, (T5) minutes | 14 | 20 | 19 | 19 |
| Scorch Time (TS2) minutes | 3.9 | 5.3 | 5.1 | 5.5 |
| Ratio 300%/100% Modulus | 3.70 | 4.00 | 4.00 | 4.30 |
| G', 1% Strain, MPa | 2.39 | 2.15 | 2.28 | 1.85 |
| Rebound @ 100° C. | 72 | 75 | 76 | 78 |
| Tangent delta, 60° C. | 0.067 | 0.051 | 0.049 | 0.044 |

TABLE 14

Combination of Dump Time and Dump Temperature

| | Compound No. | | | |
|---|---|---|---|---|
| | 3 | 6 | 7 | 8 |
| Dump Time (minute) | 5 | 5 | 7 | 10 |
| Dump Temperature (° C.) | 150 | 150 | 170 | 177 |
| Mooney Scorch (T5), minutes | 20 | 19 | 28 | >30 |
| Mooney Viscosity (ML4@ 100° C.) | 81 | 81 | 77 | 72 |
| Scorch Time (TS2), minutes | 5.3 | 5.1 | 7.7 | 9.9 |
| Modulus @ 200% MPa | 5.3 | 5.8 | 6.0 | 6.8 |
| Modulus @ 300% MPa | 9.6 | 10.5 | 11.3 | |
| Ratio 200%/100% Modulus | 2.2 | 2.2 | 2.4 | 2.5 |
| Ratio 300%/100% Modulus | 4.0 | 4.0 | 4.6 | |
| G', 1% Strain, MPa | 2.15 | 2.28 | 1.76 | 1.65 |
| Rebound@ 23° C. | 53 | 53 | 56 | 57 |
| Rebound @ 100° C. | 75 | 76 | 79 | 81 |
| Tangent delta, 60° C. | 0.051 | 0.049 | 0.041 | 0.033 |
| Tangent delta, 0° C. | 0.141 | 0.143 | 0.128 | 0.125 |

The data of Table 12 demonstrates the effect of dump time at constant dump temperature on compound performance properties. The results show that increasing the dump time from 4 minutes to 7 minutes increases scorch time, ratio 300%/100% modulus and rebound at 100° C.; while decreasing G' at 1% strain and tangent delta at 60° C. These results indicate that compounds reinforced with the filler of the present invention and produced with longer dump (mix) times at constant dump temperature can have improved scorch safety during curing and that the cured compounds could provide improved treadwear and lower rolling resistance in a tire.

The data of Table 13 demonstrates the effect of dump temperature at constant dump time on compound performance. The results show that increasing the dump temperature from 130 to 170° C. increases scorch time, ratio 300%/100% modulus and rebound at 100° C.; while decreasing G' at 1% strain and tangent delta at 60° C. These results indicate that compounds reinforced with the filler of the present invention and produced with higher dump temperature at constant dump time could have improved scorch safety during curing and the cured compound which could provide improved tread wear and lower rolling resistance in a tire. This improved performance could be obtained without a loss in productivity since the dump time remained the same.

The data of Table 14 demonstrates that there can be a combined benefit of increased dump time and dump_temperature. Compounds 7 and 8 show increases in scorch time, modulus @ 200% and 300% elongation, ratio 200%/100% and 300%/100% modulus, and rebound at 23° C. and at 100° C.; while showing decreases in Mooney viscosity, G' @ 1% strain and tangent delta at 0° C. and at 60° C. These results indicate that compounds reinforced with the filler of the present invention and produced with a combination of higher dump time and higher temperature can have improved processing properties with improved scorch safety during curing which could provide improved tread wear with higher traction and lower rolling resistance in a tire.

Example 19

The impact of compounding chemically treated filler of the present invention with primary accelerators was tested using filler A from Example 16 (Table 6).

Filler A was compounded using the ingredients and first pass procedure described in the Standard Compounding Protocol to produce part A shown in Table 15 The following procedure and ingredients enumerated in Table 15 were used for the second pass. A C.W. Brabender Mixer Type EPL2-5501 equipped with Banbury blades and with an oil heated 350-420 ml mixing chamber was used for mixing the various ingredients in the second pass. The mixer was allowed to warm for approximately 30 minutes to 50° C. The second pass was initiated by adding 205.5 phr of the strips of first pass stock to the mixer operating at 50 rpm and the preweighed combination of Santoflex® 13 antiozonant and Okerin® 7240 microcrystalline wax/paraffin wax blend. After 0.5 minutes, the second addition of the combination of RM Sulfur and accelerators was added. The second pass was completed by mixing the stock an additional 2.0 minutes while maintaining the temperature at or below 125° C. (257° F.). After completing the second pass, the temperature of the material was determined with a thermocouple to verify that it did not exceed 125° C. Cured sheets were produced following part C of the Standard Compounding Protocol.

TABLE 15

| Component | Amount (phr) Sample No. | | | | | | | | | | |
|---|---|---|---|---|---|---|---|---|---|---|---|
| | 1 | 2 | 3 | 4 | 5 | 6 | 7 | 8 | 9 | 10 | 11 |
| Part A | 205.5 | 205.5 | 205.5 | 205.5 | 205.5 | 205.5 | 205.5 | 205.5 | 205.5 | 205.5 | 205.5 |
| Antiozonant | 2.0 | 2.0 | 2.0 | 2.0 | 2.0 | 2.0 | 2.0 | 2.0 | 2.0 | 2.0 | 2.0 |
| Petroleum Wax | 1.5 | 1.5 | 1.5 | 1.5 | 1.5 | 1.5 | 1.5 | 1.5 | 1.5 | 1.5 | 1.5 |
| RM Sulfur | 2.0 | 2.0 | 2.0 | 2.0 | 2.0 | 2.0 | 2.0 | 2.0 | 2.0 | 1.4 | 2.0 |
| MBTS (12) | 1.5 | | | | | | | | | | |
| MBT (13) | | 1.5 | | | | | | | | | |
| ZMBT (14) | | | 1.5 | | | | | | | | |
| MBS (15) | | | | 1.5 | | | | | | | |
| CBS (16) | | | | | 1.5 | | | | | | |
| TBBS | | | | | | | 1.5 | | 3.0 | 1.7 | |
| DCBS (17) | | | | | | | | 1.5 | | | |
| Morfax (18) | | | | | | | | | 1.5 | | |
| OBTS (19) | | | | | | | | | | | 1.5 |
| DPG | | | | | | | | | 0.5 | 2.0 | |

(12) Altax 2-2'-dithiobisbenzothiazole obtained commercially from R. T. Vanderbilt Co., Inc.
(13) Captax 2-mercaptobenzothiazole obtained commercially from R. T. Vanderbilt Co., Inc.
(14) Vulkacit ZM zinc-2-mercaptobenzothiazole obtained commercially from Lanxess Corporation.
(15) Santocure MBS 2-(4-morpholinothio)benzothiole obtained commercially from Flexsys.
(16) Dunax N-cyclohexylbenzothiazole-2-sulfenamide obtained commercially from R. T. Vanderbilt Co., Inc.
(17) Vulkacit DZ N-cyclohexylbenzothiole-2-sulfenamide obtained commercially from Lanxess Corporation.
(18) Morfax 2-(4-morpholindithio)benzothiazole available from R. T. Vanderbilt Co., inc.
(19) Cure-Rite 18 N-oxydiethylene-2-benzothiazole sulfenamide commercially available from R. T. Vanderbilt Co., Inc.

The scorch time (TS2) and cure time (TC90) were determined in accordance with ASTM D 5289-95 using an MDR 2000 rheometer. Additional testing of modulus 300% was performed according to Part D of the standard Compounding Protocol. The results reported in Table 16 indicate that sample 9 (using TBBS and DPG accelerators) had the best combination of acceptable TS2, TC90 and 300% modulus.

TABLE 16

| | Sample | | | | | | | | | | |
|---|---|---|---|---|---|---|---|---|---|---|---|
| | 1 | 2 | 3 | 4 | 5 | 6 | 7 | 8 | 9 | 10 | 11 |
| Scorch Time (TS 2) minutes | 7.4 | 3.9 | 1.9 | 5.2 | 3.3 | 4.3 | 4.9 | 5.0 | 5.1 | 1.1 | 4.0 |
| Cure Time (TC 90) minutes | 46.8 | 46.2 | 39.4 | 35.4 | 26.2 | 29.8 | 37.3 | 36.1 | 10.8 | 19.2 | 36.3 |
| Modulus @ 300%, MPa | 3.3 | 3.9 | 2.9 | 4.8 | 4.4 | 4.9 | 5.0 | 3.9 | 10.8 | 7.5 | 7.9 |

Example 20

The impact of compounding chemically treated filler of the present invention with various accelerators was tested. Example 19 was repeated, except as noted in Tables 17-19 for the accelerators added in the second pass.

TABLE 17

| Component | Amount (phr) Sample No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Part A | 205.5 | 205.5 | 205.5 | 205.5 | 205.5 | 205.5 | 205.5 | 205.5 | 205.5 | 205.5 | 205.5 | 205.5 |
| Antiozonant | 2.0 | 2.0 | 2.0 | 2.0 | 2.0 | 2.0 | 2.0 | 2.0 | 2.0 | 2.0 | 2.0 | 2.0 |
| Petroleum Wax | 1.5 | 1.5 | 1.5 | 1.5 | 1.5 | 1.5 | 1.5 | 1.5 | 1.5 | 1.5 | 1.5 | 1.5 |
| RM Sulfur | 2.0 | 2.0 | 2.0 | 2.0 | 2.0 | 2.0 | 2.0 | 2.0 | 2.0 | 2.0 | 1.4 | 2.0 |
| TBBS | 1.0 | 1.0 | 1.0 | 1.0 | 1.0 | 2.0 | 2.0 | 2.0 | 2.0 | 2.0 | 3.0 | 1.0 |
| TMTD (20) | 0.5 | | | | | 0.15 | | | | | | |
| TMTM (21) | | 0.5 | | | | | 0.15 | | | | | |

TABLE 17-continued

| | Amount (phr) Sample No. | | | | | | | | | | | |
|---|---|---|---|---|---|---|---|---|---|---|---|---|
| Component | 1 | 2 | 3 | 4 | 5 | 6 | 7 | 8 | 9 | 10 | 11 | 12 |
| DOTG (22) | | 0.5 | | | | | | 0.15 | | | | |
| Tetrone A (23) | | | 0.5 | | | | | | 0.15 | | | |
| Vanax A (24) | | | | | | | | | | | | 0.5 |
| Methyl cumate | | | | | 0.35 | | | | | 0.1 | | |
| DPG | | | | | | | | | | | 0.5 | |

TABLE 18

| | Amount (phr) Sample No. | | | | | | | | | | | |
|---|---|---|---|---|---|---|---|---|---|---|---|---|
| Component | 13 | 14 | 15 | 16 | 17 | 18 | 19 | 20 | 21 | 22 | 23 | 24 |
| Part A | 205.5 | 205.5 | 205.5 | 205.5 | 205.5 | 205.5 | 205.5 | 205.5 | 205.5 | 205.5 | 205.5 | 205.5 |
| Antiozonant | 2.0 | 2.0 | 2.0 | 2.0 | 2.0 | 2.0 | 2.0 | 2.0 | 2.0 | 2.0 | 2.0 | 2.0 |
| Petroleum Wax | 1.5 | 1.5 | 1.5 | 1.5 | 1.5 | 1.5 | 1.5 | 1.5 | 1.5 | 1.5 | 1.5 | 1.5 |
| RM Sulfur | 2.0 | 2.0 | 2.0 | 2.0 | 2.0 | 2.0 | 2.0 | 2.0 | 2.0 | 2.0 | 1.4 | 2.0 |
| TBBS | 1.0 | 1.0 | 1.0 | 1.0 | 1.0 | 2.0 | 2.0 | 2.0 | 2.0 | 2.0 | 3.0 | 2.0 |
| ZDMC (26) | 0.5 | | | | | 0.15 | | | | | | |
| ZDEC (27) | | 0.5 | | | | | 0.15 | | | | | |
| ZDBC (28) | | | 0.5 | | | | | 0.15 | | | | |
| ZEPC (29) | | | | 0.5 | | | | | 0.15 | | | |
| ZBEC (30) | | | | | 0.5 | | | | | 1.5 | | |
| Vanax A | | | | | | | | | | | | 0.15 |
| DPG | | | | | | | | | | | 0.5 | |

TABLE 19

| | Amount (phr) Sample No. | | | | | | |
|---|---|---|---|---|---|---|---|
| Component | 25 | 26 | 27 | 28 | 29 | 30 | 31 |
| Part A | 205.5 | 205.5 | 205.5 | 205.5 | 205.5 | 205.5 | 205.5 |
| Antiozonant | 2.0 | 2.0 | 2.0 | 2.0 | 2.0 | 2.0 | 2.0 |
| Petroleum Wax | 1.5 | 1.5 | 1.5 | 1.5 | 1.5 | 1.5 | 1.5 |
| RM Sulfur | 2.0 | 2.0 | 2.0 | 2.0 | 2.0 | 2.0 | 2.0 |
| TBBS | 1.0 | 1.0 | 1.0 | 2.0 | 2.0 | 2.0 | 3.0 |
| Bismate (31) | 0.5 | | | 0.15 | | | |
| Ethyl cadmate (32) | | 0.5 | | | 0.15 | | |
| Ethyl tellurac (33) | | | 0.5 | | | 0.15 | |
| DPG | | | | | | | 0.5 |

(20) Methyltuads tetramethylthiuram disulfide obtained commercially from R. T. Vanderbilt Co., Inc.
(21) Unads tetramethylthiuram monosulfide obtained commercially from R. T. Vanderbilt Co., Inc.
(22) Di-o-tolylguanidine
(23) Sulphur donor dipentamethylene thiuram tetrasulfide commercially from Dow Chemical Company
(24) Sulphur donor 4,4'-dithiodimorpholine obtained commercially from R. T. Vanderbilt Co., Inc.
(25) Methyl cumate copper dimethyldithiocarbamate obtained commercially from R. T. Vanderbilt Co., Inc.
(26) Vulkocit zinc-N-dimethyldithiocarbamate obtained commercially from Lanxess
(27) Vulkocit zinc diethyl dithiocarbamate obtained commercially from Lanxess
(28) Vulkocit zinc-N-dibutyldithiocarbarmate obtained commercially from Lanxess
(29) Vulkocit zinc ethyl phenyl dithiocarbamate obtained commercially from Lanxess
(30) Vulkocit zinc dibenzyl dithiocarbamate obtained commercially from Lanxess
(31) Bismuth dimethyldithiocarbamate
(32) Cadmium diethyldithiocarbamate
(33) Tellurium diethyldithiocarbamate The scorch time (TS2), cure time (TC90), and 300% Modulus were tested as in Example 19. The results reported in Table 20 indicate that a desirable combination of properties were achieved in Samples 2, 11, 17-24, 27 and 29-31, each using a benzothiazole sulfenamide accelerator and a dithiocarbamate accelerator.

TABLE 20

| Sample No. | Scorch Time (TS 2), minutes | Cure Time (TC 90), minutes | Modulus @ 300%, MPa |
|---|---|---|---|
| 1 | 6.0 | 27.6 | 5.4 |
| 2 | 3.5 | 7.4 | 7.6 |
| 3 | 1.7 | 23.9 | 4.3 |
| 4 | 2.7 | 27.6 | 5.0 |
| 5 | 2.3 | 30.6 | 3.7 |
| 6 | 5.3 | 12.9 | 4.6 |
| 7 | 4.7 | 14.1 | 4.1 |
| 8 | 4.2 | 16.6 | 3.9 |
| 9 | 5.4 | 16.7 | 4.3 |
| 10 | 3.4 | 13.1 | 4.3 |
| 11 | 4.1 | 8.5 | 6.4 |
| 12 | 4.4 | 32.4 | 2.5 |
| 13 | 3.9 | 27.9 | 4.1 |
| 14 | 1.9 | 4.5 | 7.9 |
| 15 | 2.2 | 5.4 | 8.6 |
| 16 | 2.3 | 5.6 | 7.1 |
| 17 | 2.1 | 5.0 | 8.5 |
| 18 | 5.4 | 16.2 | 6.7 |
| 19 | 5.3 | 13.0 | 7.6 |
| 20 | 5.1 | 11.9 | 8.2 |
| 21 | 4.7 | 11.7 | 7.4 |
| 22 | 4.6 | 10.4 | 9.1 |
| 23 | 4.6 | 10.3 | 10.7 |
| 24 | 4.3 | 15.0 | 7.3 |

TABLE 20-continued

| Sample No. | Scorch Time (TS 2), minutes | Cure Time (TC 90), minutes | Modulus @ 300%, MPa |
|---|---|---|---|
| 25 | 1.0 | 31.3 | 5.9 |
| 26 | 1.5 | 18.8 | 7.5 |
| 27 | 2.9 | 10.4 | 6.5 |
| 28 | 2.4 | 20.5 | 7.1 |
| 29 | 3.1 | 5.9 | 8.2 |
| 30 | 4.6 | 10.3 | 7.2 |
| 31 | 4.8 | 9.7 | 9.4 |

Example 21

The impact of compounding chemically treated filler of the present invention with retardants was tested. Example 19 was repeated except as noted in Table 21 for the retardants added in the second pass.

TABLE 21

| Component | Amount (phr) Sample No. | | | | | |
|---|---|---|---|---|---|---|
| | 1 | 2 | 3 | 4 | 5 | 6 |
| Part A | 205.5 | 205.5 | 205.5 | 205.5 | 205.5 | 205.5 |
| Antiozonant | 2.0 | 2.0 | 2.0 | 2.0 | 2.0 | 2.0 |
| Petroleum Wax | 1.5 | 1.5 | 1.5 | 1.5 | 1.5 | 1.5 |
| RM Sulfur | 2.0 | 2.0 | 2.0 | 2.0 | 2.0 | 2.0 |
| TBBS | 3.0 | 3.0 | 3.0 | 3.0 | 3.0 | 3.0 |
| phthalimide (34) | 0.25 | 0.75 | 0.5 | | | |
| phthalic anhydride (35) | | | | 0.5 | | |
| Sulfonamide (36) | | | | | 0.5 | |
| DPG | 0.5 | 0.5 | | | | 0.5 |

(34) Santogard PVI N-(cyclohexylthio)phthalimide obtained commercially from Flexsys
(35) Retarder AK, a modified phthalic anhydride obtained commercially from Akrochem Corporation
(36) Vulkalent E/C N-phenyl-N-(trichloromethylsulfonyl) benzene sulfonamide obtained commercially from Lanxess The scorch time (TS2), cure time (TC90) and 300% Modulus were tested as in Example 19. The results reported in Table 22 indicate the addition of a retardant improves scorch time with acceptable cure time and 300% Modulus.

TABLE 22

| | Sample No. | | | | | |
|---|---|---|---|---|---|---|
| | 1 | 2 | 3 | 4 | 5 | 6 |
| Scorch Time (TS 2), minutes | 3.7 | 5.9 | 8.1 | 8.3 | 11.4 | 4.8 |
| Cure Time (TC 90), minutes | 7.8 | 11.9 | 16.4 | 16.8 | 23.7 | 9.7 |
| Modulus @ 300%, MPa | 9.9 | 8.7 | 8.2 | 8.9 | 8.4 | 9.4 |

Comparative Example 22

Compounding with the accelerators used in U.S. Pat. No. 4,002,594 were compared to compounding with accelerators of the present invention by following the process of Example 19 except as noted in Table 23.

TABLE 23

| Component | Amount (phr) Comparative Sample No. | | | | | | | | | Sample No. | |
|---|---|---|---|---|---|---|---|---|---|---|---|
| | 1 | 2 | 3 | 4 | 5 | 6 | 7 | 8 | 9 | 10 | 11 |
| Part A | 205.5 | 205.5 | 205.5 | 205.5 | 205.5 | 205.5 | 205.5 | 205.5 | 205.5 | 205.5 | 205.5 |
| Antiozonant | 2.0 | 2.0 | 2.0 | 2.0 | 2.0 | 2.0 | 2.0 | 2.0 | 2.0 | 2.0 | 2.0 |
| Petroleum Wax | 1.5 | 1.5 | 1.5 | 1.5 | 1.5 | 1.5 | 1.5 | 1.5 | 1.5 | 1.5 | 1.5 |
| RM Sulfur | 1.75 | 1.0 | 2.0 | 2.0 | 2.0 | 2.5 | 2.5 | 2.5 | 2.5 | 2.0 | 1.4 |
| TBBS | 1.4 | 1.4 | | | | | | | | 3.0 | 1.7 |
| Vanax A | 1.5 | 3.0 | | | 1.0 | | 1.0 | 1.0 | 1.0 | | |
| Morfax | | | 1.0 | 1.0 | 1.0 | | | | | | |
| DOTG | | | | | | 1.2 | 1.2 | | | | |
| MBTS | | | | | | 1.2 | 1.2 | 1.0 | | | |
| CBS | | | | | | | | | 1.0 | | |
| DPG | | 0.6 | 0.9 | 0.5 | | | | 1.25 | 1.25 | 0.5 | 2.0 |

The scorch time (TS 2), cure time (TC 90) and 300% Modulus were tested as in Example 19. The results reported in Table 24 indicate that the particular combinations of curatives described in U.S. Pat. No. 4,002,594 (comparative samples 1-9) do not yield the desired cure kinetics and physical properties compared to an embodiment of the curatives used in the present invention (Sample 10).

TABLE 24

| | Comparative Samples | | | | | | | | | | |
|---|---|---|---|---|---|---|---|---|---|---|---|
| | 1 | 2 | 3 | 4 | 5 | 6 | 7 | 8 | 9 | 10 | 11 |
| Scorch Time (TS 2), minutes | 5.5 | 6.8 | 2.0 | 1.3 | 3.3 | 1.0 | 1.1 | 1.1 | 1.6 | 4.9 | 1.3 |
| Cure Time (TC 90), minutes | 21.9 | 23.7 | 34.9 | 32.9 | 27.3 | 36.8 | 34.3 | 36.2 | 33.1 | 9.6 | 15.7 |
| Actual Cure Time, minutes (150° C.) | 30 | 30 | 15 | 15 | 30 | 15 | 15 | 15 | 15 | 15 | 15 |
| Modulus @ 300%, MPa | 6.7 | 8.6 | 3.2 | 4.3 | 5.2 | 6.0 | 8.4 | 7.1 | 6.8 | 9.5 | 6.2 |

Example 23

Filler Alcohol Emissions

A chemically treated filler of the present invention (filler A) was prepared following the procedure described in Example 11. The % MPTMS/SiO2 was 5.50 and the % DMDCS/SiO2 was 19.6. Filler A had the following properties: N2 1 pt. BET Surface Area=136 m$^2$/g, pH=6.4, Carbon=2.8 wt. % and SH=0.53 wt. %. Comparative filler B was a conventional non-treated precipitated silica. Comparative filler C was prepared by physically blending a conventional non-treated silica powder with mercaptopropyltrimethoxysilane (MPTMS). The % MPTMS/SiO2 was 3.0. Comparative filler D was prepared by physically blending a conventional non-treated silica powder with mercaptopropyltriethoxysilane (MPTES). The % MPTES/SiO2 was 6.0. Comparative filler E was prepared by physically blending a conventional non-treated silica powder with 3,3'-bis(triethoxysilylpropyl)tetrasulfide (TESPT). The % TESPT/SiO2 was 8.0. Essentially equal portions of each filler were analyzed for alcohol emissions using headspace-GC analysis under the following conditions:

Headspace Oven: 150° C.
Vial Equilibration Time: 20 min.
Column: 30M×0.53 mm ID DB-Wax (1.0 mm film)
Temp. Program: 35° C.-5 min-10° C./min-220° C.-8.5 min.
Inj. Port Temp.: 200° C.

The results are summarized in Table 25 below.

TABLE 25

| Filler | Methanol [ppm] | Ethanol [ppm] | Total Alcohol (ppm) |
|---|---|---|---|
| A | 16 | 31 | 48 |
| B | 1 | 6 | 7 |
| C | 12779 | 42 | 12821 |
| D | 3 | 47424 | 47427 |
| E | 0 | 27204 | 27204 |

These results indicate that the sample of the invention (filler A) has significantly lower alcohol emissions than fillers produced by blending related alkoxysilanes with precipitated silica.

Although the present invention has been described with references to specific details of certain embodiments thereof, it is not intended that such details should be regarded as limitations upon the scope of the invention except in so far as they are included in the claims.

What is claimed is:

1. In the process of producing a chemically treated siliceous filler by contacting an acidic aqueous suspension of amorphous precipitated silica with a coupling agent, optionally in the presence of a surfactant and/or a water-miscible solvent, to form an acidic aqueous suspension of chemically treated precipitated silica, and recovering said chemically treated precipitated silica, the improvement comprising:
   (a) providing an acidic aqueous suspension of amorphous precipitated silica having a pH of 2.5 or less,
   (b) treating the precipitated silica with a coupling agent comprising a combination of:
      (i) mercaptoorganometallic compound and
      (ii) non-sulfur organometallic compound,
   the weight ratio of (i) to (ii) being at least 0.05:1, under conditions which result in essentially complete hydrolysis of any alkoxy groups associated with the coupling agent, thereby to produce chemically treated precipitated silica,
   (c) raising the pH of the acidic aqueous suspension of chemically treated precipitated silica to from 3 to 10 with acid neutralizing agent that does not adversely affect the chemically treated precipitated silica, and
   (d) separating chemically treated precipitated silica from the aqueous suspension while retaining in the aqueous phase substantially all of any alcohol by-product produced by hydrolysis of alkoxy groups associated with the coupling agent, said chemically treated precipitated silica having a carbon content of greater than 1 weight percent, a mercapto content of greater than 0.15 weight percent, a Silane Conversion Index of at least 0.3 and a Standard Reinforcement Index of at least 4, as measured using the Standard Compounding Protocol.

2. The process of claim 1 wherein said treatment of precipitated silica with coupling agent produces by-product alcohol and said alcohol by-product is retained in said aqueous phase such that less than 4000 ppm of by-product alcohol is released from said separated chemically treated precipitated silica.

3. The process of claim 1 wherein the mercaptoorganometallic compound is represented by the following formula:

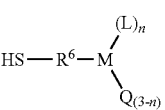

wherein M is silicon, L is halogen or —OR$^7$, Q is hydrogen, $C_1$-$C_{12}$ alkyl, or halosubstituted $C_1$-$C_{12}$ alkyl, R$^6$ is $C_1$-$C_{12}$ alkylene, R$^7$ is $C_1$-$C_{12}$ alkyl or alkoxyalkyl containing from 2 to 12 carbon atoms, said halogen or (halo) group being chloro, bromo, iodo or fluoro, and n is 1, 2 or 3.

4. The process of claim 3 wherein the mercapto group of the mercaptoorganometallic compound is blocked.

5. The process of claim 1 wherein said non-sulfur organometallic compound is chosen from compound(s) represented by formulae II, III, IV and V:

$$R^1{}_a SiX_{(4-a)} \qquad \text{II}$$

$$R^2{}_{2c+2} Si_c O_{(c-1)} \qquad \text{III}$$

$$R^3{}_{2a}Si_dO_d \qquad \text{IV}$$

$$(R^2{}_3Si)_k NR^4{}_{(3-k)} \qquad \text{V}$$

and mixtures of said compounds; wherein each $R^1$ is independently a hydrocarbon group of from 1 to 18 carbon atoms or $R^1$ is an organofunctional hydrocarbon group of from 1 to 12 carbon atoms, said functional group being amino, carboxylic acid, carbinol ester or amido; each X is independently chosen from halogen, amino, alkoxy groups of from 1 to 12 carbon atoms and acyloxy groups of from 1 to 12 carbon atoms, a is the integer 1, 2 or 3; each $R^2$ is independently halo, hydroxy, or a hydrocarbon group containing from 1 to 18 carbon atoms, with the proviso that at least 50 mole percent of the $R^2$ substituents are hydrocarbon groups containing from 1 to 18 carbon atoms, c is an integer from 2 to 10,000; each $R^3$ is independently halo, hydroxy, or a hydrocarbon group containing from 1 to 18 carbon atoms and d is an integer from 3 to 20; each $R^4$ is independently hydrogen or a hydrocarbon group containing from 1 to 18 carbon atoms and k is 1 or 2; said halo or halogen being chosen from chloro, fluoro, bromo or iodo.

6. The process of claim 1 wherein the acidic aqueous suspension of amorphous precipitated silica has a pH of 2 or less, and the weight ratio of (i) mercaptoorganometallic compound to (ii) non-sulfur organometallic compound is from 0.05:1 to 10:1.

7. The process of claim 6 wherein the acid neutralizing agent is chosen from sodium hydroxide, potassium hydroxide, ammonium hydroxide and sodium bicarbonate.

8. The process of claim 6 wherein the chemically treated precipitated silica has a carbon content of at least 1.5 weight percent, a mercapto content of at least 0.3 weight percent, a Silane Conversion Index of at least 0.4, and a Standard Reinforcement Index of at least 4.5, as measured using the Standard Compounding Protocol.

9. The process of claim 6 wherein the mercaptoorganometallic compound is represented by the following formula:

$$HS-R^6-M\begin{matrix}(L)_n\\ \diagdown\\ Q_{(3-n)}\end{matrix}$$

wherein M is silicon, L is chloro or $-OR^7$, Q is hydrogen, $C_1$-$C_{12}$ alkyl, or chlorosubstituted $C_1$-$C_{12}$ alkyl, $R^6$ is $C_1$-$C_3$ alkylene, $R^7$ is $C_1$-$C_4$ alkyl, and n is 1, 2 or 3.

10. The process of claim 6 wherein the non-sulfur organometallic compound is represented by the following formula:

$$R^1{}_a SiX_{(4-a)}$$

wherein each $R^1$ is a hydrocarbon group of from 1 to 12 carbon atoms, X is chloro or $C_1$-$C_3$ alkoxy, and a is the integer 1, 2, or 3.

11. The process of claim 1 wherein the treatment step (b) is performed at temperatures of from 30° C. to 150° C.

* * * * *